United States Patent
Shanjani et al.

(10) Patent No.: US 12,171,633 B2
(45) Date of Patent: Dec. 24, 2024

(54) SENSORS FOR MONITORING ORAL APPLIANCES

(71) Applicant: Align Technology, Inc., San Jose, CA (US)

(72) Inventors: Yaser Shanjani, Sunnyvale, CA (US); Bruce Cam, San Jose, CA (US); Jun Sato, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 203 days.

(21) Appl. No.: 17/643,394

(22) Filed: Dec. 8, 2021

(65) Prior Publication Data

US 2022/0096207 A1   Mar. 31, 2022

Related U.S. Application Data

(63) Continuation of application No. 16/206,894, filed on Nov. 30, 2018, now Pat. No. 11,219,506.

(60) Provisional application No. 62/593,241, filed on Nov. 30, 2017.

(51) Int. Cl.
| | |
|---|---|
| *A61C 7/00* | (2006.01) |
| *A61C 7/08* | (2006.01) |
| *A61C 7/10* | (2006.01) |
| *A61C 7/36* | (2006.01) |
| *A61C 19/045* | (2006.01) |
| *A61C 19/05* | (2006.01) |

(52) U.S. Cl.
CPC ............... *A61C 7/002* (2013.01); *A61C 7/08* (2013.01); *A61C 7/10* (2013.01); *A61C 7/36* (2013.01); *A61C 19/045* (2013.01); *A61C 19/05* (2013.01); *A61C 2204/005* (2013.01)

(58) Field of Classification Search
CPC .. A61C 7/002; A61C 7/36; A61C 7/10; A61C 7/08; A61C 19/05; A61C 19/045; A61C 2204/005
USPC .............................................................. 433/6
See application file for complete search history.

(56) References Cited

U.S. PATENT DOCUMENTS 4,764,111 A * 8/1988 Knierim ................... A61C 7/00
340/309.7
5,820,368 A   10/1998 Wolk
(Continued)

FOREIGN PATENT DOCUMENTS

| CN | 103405276 A | 11/2013 |
| CN | 104434323 A | 3/2015 |
| CN | 205458726 U | 8/2016 |

*Primary Examiner* — Matthew M Nelson
(74) *Attorney, Agent, or Firm* — Shay Glenn LLP

(57) ABSTRACT

Systems and methods for monitoring the status of oral appliances using sensors. One or more oral appliances may include one or more sensor receiver and emitter pairs configured to collect sensor data. Each sensor receiver and emitter pair may include a sensor receiver on or in a first portion of the oral appliance(s) and a sensor emitter on a second portion of the oral appliance(s), where each sensor receiver is configured to receive a signal emitted by a corresponding sensor emitter. At least one processor may be configured to determine the status of the oral appliance(s) and determine whether to modify a treatment plan implemented by the oral appliance(s) based on the status. The status may include one or more of: user compliance, condition of the oral appliance(s), and effectiveness of the oral appliance(s).

19 Claims, 9 Drawing Sheets

(56) References Cited

U.S. PATENT DOCUMENTS

| | | |
|---|---|---|
| 5,989,023 A * | 11/1999 | Summer ............... A61C 19/045 433/69 |
| 6,386,864 B1 | 5/2002 | Kuo |
| 6,783,604 B2 | 8/2004 | Tricca |
| 6,790,035 B2 | 9/2004 | Tricca et al. |
| 6,947,038 B1 | 9/2005 | Anh et al. |
| 7,104,792 B2 | 9/2006 | Taub et al. |
| 7,160,107 B2 | 1/2007 | Kopelman et al. |
| 7,448,514 B2 | 11/2008 | Wen |
| 7,600,999 B2 | 10/2009 | Knopp |
| 7,766,658 B2 | 8/2010 | Tricca et al. |
| 7,771,195 B2 | 8/2010 | Knopp et al. |
| 7,871,269 B2 | 1/2011 | Wu et al. |
| 7,883,334 B2 | 2/2011 | Li et al. |
| 7,914,283 B2 | 3/2011 | Kuo |
| 8,235,715 B2 | 8/2012 | Kuo |
| 8,337,199 B2 | 12/2012 | Wen |
| 8,401,686 B2 | 3/2013 | Moss et al. |
| 8,562,337 B2 | 10/2013 | Kuo et al. |
| 8,684,729 B2 | 4/2014 | Wen |
| 8,758,009 B2 | 6/2014 | Chen et al. |
| 8,771,149 B2 * | 7/2014 | Rahman ............... A61C 19/04 482/8 |
| 9,119,691 B2 | 9/2015 | Namiranian et al. |
| 9,326,831 B2 | 5/2016 | Cheang |
| 9,655,691 B2 | 5/2017 | Li et al. |
| 9,700,385 B2 | 7/2017 | Webber |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,363,116 B2 | 7/2019 | Boronkay |
| 10,383,705 B2 * | 8/2019 | Shanjani ............... A61C 19/04 |
| D865,180 S | 10/2019 | Bauer et al. |
| 10,463,452 B2 | 11/2019 | Matov et al. |
| 10,492,888 B2 | 12/2019 | Chen et al. |
| 10,517,701 B2 | 12/2019 | Boronkay |
| 10,537,463 B2 | 1/2020 | Kopelman |
| 10,555,792 B2 | 2/2020 | Kopelman et al. |
| 10,588,776 B2 | 3/2020 | Cam et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,881,487 B2 | 1/2021 | Cam et al. |
| 10,912,629 B2 | 2/2021 | Tanugula et al. |
| 11,154,382 B2 | 10/2021 | Kopelman et al. |
| 11,166,788 B2 | 11/2021 | Webber |
| 11,174,338 B2 | 11/2021 | Liska et al. |
| 2004/0166462 A1 | 8/2004 | Phan et al. |
| 2005/0014105 A1 | 1/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0199142 A1 | 9/2006 | Liu et al. |
| 2007/0277836 A1 * | 12/2007 | Longley ............... A61F 5/566 128/848 |
| 2008/0160473 A1 | 7/2008 | Li et al. |
| 2008/0286716 A1 | 11/2008 | Sherwood |
| 2008/0286717 A1 | 11/2008 | Sherwood |
| 2009/0280450 A1 | 11/2009 | Kuo |
| 2010/0055635 A1 | 3/2010 | Kakavand |
| 2010/0129763 A1 | 5/2010 | Kuo |
| 2013/0140289 A1 * | 6/2013 | Baratier ............... A61C 7/36 433/25 |
| 2014/0067334 A1 | 3/2014 | Kuo |
| 2014/0257051 A1 * | 9/2014 | Cam ............... A61B 5/0004 600/595 |
| 2014/0294273 A1 * | 10/2014 | Jaisson ............... A61B 5/0035 382/131 |
| 2015/0150501 A1 * | 6/2015 | George ............... A61B 5/6817 600/301 |
| 2015/0230885 A1 * | 8/2015 | Wucher ............... A61C 7/002 433/2 |
| 2015/0265376 A1 | 9/2015 | Kopelman |
| 2015/0366638 A1 | 12/2015 | Kopelman et al. |
| 2015/0374469 A1 * | 12/2015 | Konno ............... A61B 5/228 433/27 |
| 2016/0128624 A1 * | 5/2016 | Matt ............... A61C 19/045 600/301 |
| 2016/0193014 A1 | 7/2016 | Morton et al. |
| 2016/0242870 A1 | 8/2016 | Matov et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007386 A1 | 1/2017 | Mason et al. |
| 2017/0056131 A1 * | 3/2017 | Alauddin ............... A61C 19/04 |
| 2017/0100214 A1 * | 4/2017 | Wen ............... G16H 30/20 |
| 2017/0128162 A1 * | 5/2017 | Dalla-Bona ............... A61C 7/08 |
| 2017/0251954 A1 * | 9/2017 | Lotan ............... A61B 5/0002 |
| 2017/0252140 A1 * | 9/2017 | Murphy ............... A61B 5/4833 |
| 2017/0312051 A1 * | 11/2017 | Lucas ............... A61C 5/007 |
| 2018/0000563 A1 * | 1/2018 | Shanjani ............... H04B 5/77 |
| 2018/0000565 A1 * | 1/2018 | Shanjani ............... A61C 19/04 |
| 2018/0014924 A1 * | 1/2018 | Brawn ............... A61C 7/08 |
| 2018/0055420 A1 * | 3/2018 | Gassler ............... A61B 5/4542 |
| 2018/0078334 A1 * | 3/2018 | Lotan ............... A61C 7/08 |
| 2018/0085059 A1 * | 3/2018 | Lee ............... A61B 5/682 |
| 2018/0140381 A1 * | 5/2018 | Gravenstein ............... A61C 7/146 |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0029775 A1 | 1/2019 | Morton et al. |
| 2019/0069975 A1 * | 3/2019 | Cam ............... A61C 7/002 |
| 2019/0099129 A1 | 4/2019 | Kopelman et al. |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0231477 A1 * | 8/2019 | Shanjani ............... A61C 7/08 |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2019/0328313 A1 * | 10/2019 | Hanssen ............... A61C 7/12 |
| 2019/0343606 A1 | 11/2019 | Wu et al. |
| 2020/0000553 A1 | 1/2020 | Makarenkova et al. |
| 2020/0046461 A1 * | 2/2020 | Shanjani ............... A61C 19/04 |
| 2020/0086553 A1 | 3/2020 | Mojdeh et al. |
| 2020/0093571 A1 * | 3/2020 | Shanjani ............... H04B 5/77 |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0100871 A1 | 4/2020 | Wang et al. |
| 2020/0155276 A1 * | 5/2020 | Cam ............... A61F 7/007 |
| 2020/0188062 A1 | 6/2020 | Kopelman et al. |
| 2020/0214598 A1 * | 7/2020 | Li ............... B33Y 80/00 |
| 2020/0214801 A1 | 7/2020 | Wang et al. |
| 2020/0390523 A1 | 12/2020 | Sato et al. |
| 2021/0078357 A1 | 3/2021 | Venkatasanthanam et al. |
| 2021/0147672 A1 | 5/2021 | Cole et al. |

\* cited by examiner

SENSORS FOR MONITORING ORAL APPLIANCES

CROSS REFERENCE TO RELATED APPLICATIONS

This patent application is a continuation of U.S. patent application Ser. No. 16/206,894, filed on Nov. 30, 2018, titled "SENSORS FOR MONITORING ORAL APPLIANCES," now U.S. Publication No. US-2019-0231477-A1, which claims priority to U.S. Provisional Patent Application No. 62/593,241, filed Nov. 30, 2017, titled "SENSORS FOR MONITORING ORAL APPLIANCES," which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are oral appliances having one or more sensors, and methods of using them.

BACKGROUND

Orthodontic procedures typically involve repositioning a patient's teeth to a desired arrangement in order to correct malocclusions and/or improve aesthetics. To achieve these objectives, orthodontic appliances such as braces, shell aligners, and the like can be applied to the patient's teeth by an orthodontic practitioner. The appliance can be configured to exert force on one or more teeth in order to effect desired tooth movements according to a treatment plan.

During orthodontic treatment with patient-removable appliances, the appliance may not function correctly due to a defect, or may develop a defect during use. In some instances, the appliance may be improperly installed, formed, or operated by the practitioner. There is a need for methods and apparatuses that allow monitoring of a state of the intraoral appliances. Described herein are methods and apparatuses for performing such monitoring.

SUMMARY OF THE DISCLOSURE

Described herein are apparatuses, including devices and systems, including in particular orthodontic appliances (e.g., oral appliances) and methods for monitoring an orthodontic appliance, including, but not limited to monitoring a parameter or state of the orthodontic appliance.

In particular, described herein are oral appliances that are configured to determine that they are properly worn and/or are properly functioning when worn in the user's oral cavity. Applicants note that these apparatuses (e.g., devices and systems, which may include orthodontic aligners, mandibular repositioning apparatuses, arch expanders/palatal expanders, etc.) may function as compliance monitors, including that a patient is wearing the apparatus and/or complying with an orthodontic treatment, but are not limited to compliance monitoring. In particular, these apparatuses may monitor how well the device is contacting the patient's oral cavity, including teeth, gingiva, palate, etc. Alternatively or additionally, these apparatuses may be configured to detect and/or monitor wear and/or damage to the apparatus. The apparatus may include one or more sensors (wherein a sensor may comprise a sensor receiving and/or a sensor emitter and sensor receiver pair) providing data to a processor; the processor may analyze, including in real time, how well the apparatus is being worn, wear on the apparatus, damage to the apparatus, or the like. The processor may be part of the oral appliance worn by the patient or it may be in communication (wired or wireless communication, including real-time or near real-time communication) with the oral appliance. Thus, any of the apparatuses and methods described herein may determine and may signal or otherwise indicate how well the apparatus is operating.

Monitoring may alternatively or additionally include monitoring status of the appliance, monitoring wear of the appliance, monitoring the geographic/spatial location of the appliance, etc. In some embodiments, an orthodontic appliance includes one or more sensors configured to obtain sensor data; these sensors may include those that are indicative of a state of the appliance. As used herein, the state of the appliance may include, for example, how well the appliance is fitting the patient when worn, if the appliance has developed any damage or wear, if the appliance is defective, etc. The appliance can include one or more processors operably coupled to the sensor(s) and configured to process the sensor data so as to indicate a state of the appliance, thus enabling electronic monitoring of the appliance before and/or during a prescribed course of orthodontic treatment. Advantageously, the apparatuses (e.g., devices, systems, etc.) and methods described herein may improve treatment efficacy, as well as provide data useful to the practitioner for designing and monitoring orthodontic treatments.

For example, any of the apparatuses described herein may be configured to include one or more tooth-contacting region(s). A device for monitoring the status of an intraoral appliance may include an appliance shell comprising a plurality of teeth receiving regions (e.g., cavities) and one or more sensors operably coupled to the appliance shell and configured to generate sensor data indicative of a state of the appliance (e.g., where an how well the appliance is contacting the teeth, such as the presence of any gaps between the appliance and the teeth, buckling of the appliance, defects such as tears, cracks, etc. in the appliance, and/or operating outside of a predetermined range of parameter values), and a processor operably coupled to the one or more sensors and configured to process the sensor data so as to determine and/or indicate the state of the appliance. Sensors may be configured, for example, to determine the quality of fit of the appliance by measuring contact (pressure, location, etc.) between the appliance and the oral cavity (e.g., teeth, gingiva, palate, etc.). For example, sensors may include one or more capacitive or other electrical sensors within or on the appliance that indicate contact between the appliance and the user's teeth. Signals from such contact sensors may be received (continuously and/or periodically) to determine when contact is being made with which parts of the patient's teeth and the appliance. The processor may be configured to analyze the sensed data from one or more such sensors to determine that appropriate contact (e.g., of all or a predefined sub-set of sensors in/on the appliance) with the apparatus. A poorly-fitting appliance may not make full contact with all of the sensors, or may make contact with a subset of sensors indicating poor contact. The processor may also be configured to examine the intensity of the contact and may indicate that the level of the signal (indicating contact/non-contact) is outside of a range or threshold indicating good contact. The processor may record and/or transmit this information. In some variations this information may be logged for later use by the dental professional and/or may be used to alert the patient (e.g., via display on a smartphone, tablet, etc., and/or via SMS, text message, or the like) that the appliance should be adjusted.

Thus, the apparatuses and methods described herein may be configured to detect ("smart detection") engagement of positioning features of a mandibular repositioning device, determine an expansion rate of a palatal expander, or identify a defect in an intraoral appliance. For example, as will be described in greater detail herein, any of the apparatuses described herein may be configured with one or more sensors that detect interaction between different portion of an oral appliance and/or between different oral appliances or components of an oral appliance. For example, mandibular repositioning devices may include contact regions that engage a first oral appliance (e.g., a low arch appliance) and a second oral appliance (e.g., an upper arch appliance). The apparatuses described herein may detect and determine interaction between the first and second oral appliances. For example such apparatuses may monitor the bite interaction (e.g., intercuspation) between the upper and lower dental arch. Sensors on either or both occlusal surface of the appliance may detect interaction with the opposite dental appliance, or in some variations, the teeth on the opposite arch.

As mentioned, the methods and apparatuses described herein may generally be used with or as part of any monitoring devices for monitoring an orthodontic appliance. Monitoring may be continuous (e.g., always on) or sampled at a regular frequency (e.g., between 0.001 Hz and 1 KHz, between 1 and 120 times/hour, between 1 and 24 time/day, etc.) or sampled for a discrete time after inserting the apparatus. For example, described herein are apparatuses that may be configured to record sensor data from appliances such as orthodontic aligners.

For example, in any of these apparatuses, the data may be stored in physical memory on the monitoring apparatus and may be retrieved by another device in communication with the monitoring apparatus. Retrieval may be done wirelessly, e.g., using near-field communication (NFC) and/or Bluetooth (BLE) technologies to use a smartphone or other hand-held device to retrieve the data. Specifically described herein are orthodontic devices using them that include one or more sensors (e.g., temperature sensor(s), capacitive sensor(s), pressure sensor(s), etc.), one or more processors (e.g., a CPU, etc.), a communication module (e.g., a NFC communication module), an antenna, and a power source (e.g., battery, etc.). A case or holder may be used to boost and/or relay the signals from the small monitoring apparatus to a handheld device such as a smartphone.

In some examples, an orthodontic apparatus including (or configured as) an intraoral appliance may generally be configured to monitor a state of an intraoral appliance, and may include a housing enclosing a power source and monitoring circuitry, the monitoring circuitry comprising a processor, a memory, and one or more sensors, and an elastomeric overmold encapsulating the housing. In general, any of the orthodontic devices described herein may be sized to fit against or over one tooth. Thus, the sensor(s) and any associated electronics (memory, processor, power supplies, etc.) may be compact and configured so as not to intrude into the patient's oral cavity substantially. For example a housing enclosing a part of the sensor(s) or affiliated electronics may have a maximum diameter of 2 cm or less, 1.5 cm or less, 1.0 cm or less, 0.9 cm or less, 0.8 cm or less, 0.7 cm or less, 0.6 cm or less, etc.). The monitoring apparatus housing may generally be thin (e.g., 1.0 cm or less, 0.9 cm or less, 0.8 cm or less, 0.7 cm or less, 0.6 cm or less, 0.5 cm or less, 0.4 cm or less, etc.). In any of these apparatuses, the monitoring circuitry may be configured for a wired connection, e.g., may include a plurality of data electrodes external to the housing.

Although the apparatuses and methods described herein include numerous examples of near field communication (NFC), including NFC-to-NFC communication, any of the methods and apparatuses described herein may be used with other types of wireless communication modes, including, without limitation, Wi-Fi, radio (RF, UHF, etc.), infrared (IR), microwave, Bluetooth (including Bluetooth low energy or BLE), magnetic field induction (including NFC), Wimax, Zigbee, ultrasound, etc. In particular, the methods and apparatuses described herein may include apparatuses that convert between these different wireless modes.

For example, described herein are orthodontic appliance systems including sensors (e.g., pairs of sensor emitters and sensor receivers) that detect relative positon and/or orientation between the sensor emitter and sensor receiver. The sensor emitters and sensor receivers can be used to determine a state of the orthodontic appliance (such as a deformation of the orthodontic appliance, defects in the orthodontic appliance, etc.) and/or use, e.g., compliance, of the orthodontic appliance. These orthodontic appliance systems may also be used to track the effectiveness of the appliance, including tracking tooth and/or palatal movement.

For example, described herein are orthodontic appliance systems comprising: a first orthodontic appliance shaped to receive the patient's teeth; a sensor receiver disposed on or in the first appliance, wherein the sensor receiver is configured to detect a signal from a sensor emitter on another portion of the first appliance or on a second orthodontic appliance worn by the subject; and at least one processor configured to receive sensor data from the sensor receiver and to determine a relative position, orientation or position and orientation between the sensor receiver and the sensor emitter.

For example, an orthodontic appliance system may include: an orthodontic appliance shaped to receive the patient's teeth; a sensor emitter disposed on or in the appliance at a first location; a sensor receiver disposed on or in the appliance at a second location, wherein the sensor receiver is configured to detect a signal from the sensor emitter; and at least one processor configured to receive sensor data from the sensor receiver and to determine a relative position, orientation or position and orientation between the sensor receiver and the sensor emitter.

In any of these apparatuses, the sensor receiver and sensor emitter may be configured to emit and detect electromagnetic energy (e.g., current, voltage, electrical field, magnetic field, etc.) and/or optical energy (e.g., light). For example, the sensor receiver may be one or more of: an optical sensor, an electromagnetic sensor, a capacitive sensor, or a magnetic sensor. The sensor emitter may be configured to emit electromagnetic energy and/or optical energy for detection by the sensor receiver. In some variations the same sensor may be configured as both a sensor receiver and a sensor emitter. For example, a sensor emitter may be an electrode configured to receive and/or emit electrical energy (e.g., for detection of voltage, current, capacitance, etc.).

As mentioned, any of these systems may include at least one processor that may be disposed on or within the orthodontic appliance; alternatively the processor(s) may be located remotely. For example, the one processors may be coupled via an electrical trace on or in the first orthodontic appliance and/or may wirelessly communicate with the sensor receiver(s).

The first and second orthodontic appliances may be removable. For example, the orthodontic appliance may comprise a polymeric shell having a plurality of teeth-receiving cavities.

Any of these systems may include a second orthodontic appliance; the sensor emitter may be on or in the second orthodontic appliance. Alternatively, the sensor emitter may be on the same (e.g., first) orthodontic appliance as the sensor receiver.

In some variations the system is configured to monitoring mandibular repositioning. For example, the first orthodontic appliance may comprises a first mandibular repositioning feature and the second orthodontic appliance may comprise a second mandibular repositioning feature; the processor may be configured to determine the relative position, orientation or position and orientation between the first and second mandibular repositioning features.

Any of these systems may include a wireless communication electronics disposed on or within the first orthodontic appliance, the wireless communication electronics being configured to transfer the sensor data to the at least one processor.

Any of these systems may include a non-transitory computer-readable storage medium configured to store the sensor data.

The at least one processor may be configured to indicate that the orthodontic appliance is one or more of: deformed, has a defect, is in close proximity to the sensor receiver, and/or that the orthodontic appliance is applying a force to the patient's teeth. For example, the processor may be configured to detect, based on the signal received, changes in the relative positions and/or orientations of the sensor receiver and sensor emitter; these changes may be monitored over time. In some variations the one or more processor monitors the rate of change of the relative positions of the sensor emitter and sensor receiver.

The processor may convert signals from the sensor emitter/sensor receiver pairs (e.g., the sensor receiver) into distances and/or intensities. For example, in some variations the processor includes a memory storing one or more look-up tables for converting sensor values into distances.

In general, the orthodontic appliance may be, for example, a palatal expander, a dental aligner, etc.

Also described herein are methods of monitoring an orthodontic appliance using any of the apparatuses described herein. For example, a method of monitoring an orthodontic appliance may include: positioning a first orthodontic appliance in the patient's mouth, so that the first orthodontic appliance receives at least some of the patient's teeth; emitting a signal from sensor emitter within the patient's mouth; receiving the signal with a sensor receiver on or in the first orthodontic appliance; transmitting the signal to at least one processor; determining a relative position, orientation or position and orientation between the sensor receiver and the sensor emitter; and outputting an indicator related to the relative position orientation or position and orientation between the sensor receiver and the sensor emitter.

For example, a method for monitoring an orthodontic appliance may include: positioning a first orthodontic appliance in the patient's mouth, so that the first orthodontic appliance receives at least some of the patient's teeth; positioning a second orthodontic appliance in the patient's mouth, wherein the second orthodontic appliance receives at least some of the patient's teeth; emitting a signal from sensor emitter on or in the second orthodontic appliance; receiving the signal with a sensor receiver on or in the first orthodontic appliance; transmitting the signal to at least one processor; determining, in the processor, a relative position, orientation or position and orientation between the sensor receiver and the sensor emitter; and outputting, from the processor, the relative position orientation or position and orientation between the sensor receiver and the sensor emitter.

Positioning the first orthodontic appliance may comprise positioning the first orthodontic appliance wherein the sensor receiver is on or in a first mandibular repositioning feature.

Emitting the signal from a sensor emitter may comprise emitting an electromagnetic signal or an optical signal. For example, an electromagnetic signal may comprise one or more of: an electrical signal, a magnetic signal, an electric current.

Any of these methods may also include positioning a second orthodontic appliance in the patient's mouth, wherein the sensor emitter is on or in the second orthodontic appliance.

Emitting the signal may comprise emitting the signal from the sensor emitter, further wherein the sensor emitter is on or in the first orthodontic appliance. Transmitting the signal may comprise wireless transmitting the signal.

Determining a relative position, orientation or position and orientation between the sensor receiver and the sensor emitter may comprise indicating that the orthodontic appliance is deformed, further wherein outputting the indicator related to the relative position orientation or position and orientation may comprise outputting that the orthodontic appliance is deformed. Determining a relative position, orientation or position and orientation between the sensor receiver and the sensor emitter may comprise indicating that the orthodontic appliance has a defect, further wherein outputting the indicator related to the relative position orientation or position and orientation may comprise outputting that the orthodontic appliance has a defect. Determining a relative position, orientation or position and orientation between the sensor receiver and the sensor emitter may comprise indicating that the sensor receiver is in close proximity to the sensor emitter, further wherein outputting the indicator related to the relative position orientation or position and orientation may comprise outputting that the proximity between the sensor receiver and sensor emitter. In some variations, determining a relative position, orientation or position and orientation between the sensor receiver and the sensor emitter comprises indicating that the orthodontic appliance is applying a force to the patient's teeth, further wherein outputting the indicator related to the relative position orientation or position and orientation comprises outputting that the orthodontic appliance is applying a force to the patient's teeth or outputting the applied force.

An indicator related to the relative position, orientation or position and orientation between the sensor receiver and sensor emitter may include a numeric indicator (e.g., positional value, coordinates, rate of change over time, etc.) with or without units, and/or an indicator that the position and/or orientation between the sensor emitter and sensor receiver (or a portion of the first and/or second orthodontic appliance(s) to which they are connected) has not changed, has changed, has changed within a range or degree, etc.

Also described herein are methods, systems and apparatuses that indicate one or more states of an orthodontic appliance. For example, described herein are orthodontic devices, comprising: an intraoral appliance shaped to receive the patient's teeth; a first sensor disposed on or in the intraoral appliance; a second sensor disposed on or in the intraoral appliance; and at least one processor configured to receive sensor data from the first and second sensors and to indicate of a state of the orthodontic device based on the sensor data. The first and second sensors comprise one or more of: a capacitive sensor, a magnetic sensor, a force sensor, a pressure sensor, and an optical sensor.

The at least one processor may be disposed on or within the intraoral appliance, as described above. The at least one processor may be disposed on or within an electronic device remote from the orthodontic device. For example, the deices may include a wireless communication electronics disposed on or within the first intraoral appliance or the second intraoral appliance, the wireless communication electronics being configured to transfer sensor data from the first and second sensors to the at least one processor.

The intraoral appliance may comprise a polymeric shell having a plurality of teeth-receiving cavities. The devices may include a non-transitory computer-readable storage medium configured to store sensor data from the first and second sensors. The at least one processor may be configured to indicate that the orthodontic device is deformed. The at least one processor may be configured to indicate that the orthodontic device has a defect.

The at least one processor may be configured to indicate that the first sensor is in close proximity to the second sensor. The at least one processor is configured to indicate that the orthodontic device is applying a force to the patient's teeth. The at least one processor may be configured to indicate a position of the first sensor relative to a position of the second sensor.

Also described herein are methods for monitoring an orthodontic device. For example, a method may include: positioning an intraoral appliance in the patient's intraoral cavity, the intraoral appliance shaped to receive the patient's teeth and comprising a plurality of sensors each positioned on or in a different part of the intraoral appliance; receiving a sensed parameter from each of the plurality of sensors; and determining a state of the orthodontic device based on the sensed parameters. The sensed parameter may include one or more of: a capacitance, a magnetic field, a force measurement, a voltage, and an impedance. The determining step may comprise determining if a first portion of the intraoral appliance is aligned properly with respect to a second portion of the intraoral appliance. The determining step may comprise determining if the intraoral appliance is deformed.

The determining step may comprise determining if the intraoral appliance has a defect. The determining step may comprise determining if the intraoral appliance is applying an appropriate force to the patient's teeth.

As mentioned above, any of these methods and apparatuses may be configured to monitor mandibular repositioning using an orthodontic appliance. For example, determining the correct interaction between mandibular repositioning features of an appliance.

A mandibular repositioning system may include: a first intraoral appliance shaped to receive the patient's upper teeth and comprising a first mandibular repositioning feature; a first sensor disposed on or in the first mandibular repositioning feature; a second intraoral appliance shaped to receive the patient's lower teeth and comprising a second mandibular repositioning feature; a second sensor disposed on or in the second mandibular repositioning feature; at least one processor configured to receive sensor data from either or both the first and second sensors to detect contact between the first and second mandibular repositioning features. The first and second sensors may include one or more of: capacitive sensors, magnetic sensors, force sensors, pressure sensors, and optical sensors.

The at least one processor may be disposed on or within the first intraoral appliance or the second intraoral appliance. The at least one processor may be disposed on or within an electronic system remote from the first and second intraoral appliances. Any of these systems may include wireless communication electronics disposed on or within the first intraoral appliance or the second intraoral appliance, the wireless communication electronics being configured to transfer sensor data from the first and second sensors to the at least one processor.

The first and second intraoral appliances may comprises a polymeric shell having a plurality of teeth-receiving cavities.

In some variations the system further includes a third sensor disposed on or in the first mandibular repositioning feature; a fourth sensor disposed on or in the second mandibular repositioning feature; wherein the first sensor is disposed on a first side of the first mandibular repositioning feature, the third sensor is disposed on a second side of the first mandibular repositioning feature, the second sensor is disposed on a first side of the second mandibular repositioning feature, and the fourth sensor is disposed on a second side of the second mandibular repositioning feature; and wherein the at least one processor is configured to receive sensor data from the first, second, third, and fourth sensors to detect proper positioning when the first sensor contacts the second sensor, and to detect reverse positioning when the third sensor contacts the fourth sensor.

Also described herein are methods for monitoring a mandibular repositioning system, the method comprising: receiving sensed parameters from a first plurality of sensors of a first orthodontic appliance worn in a patient's mouth and a second plurality of sensors of a second orthodontic appliance worn in a patient's mouth, wherein the first orthodontic appliance is shaped to receive the patient's upper teeth and comprises the first plurality of sensors on or adjacent to a first positioning feature of the first intraoral appliance, further wherein the second orthodontic appliance is shaped to receive the patient's lower teeth and comprises the second plurality of sensors on or adjacent to a second positioning feature of the second intraoral appliance; and determining engagement between the first positioning feature and the second positioning feature based on the sensed parameter.

Also described herein are apparatuses (devices and systems) for monitoring palatal expansion by detecting movement/separation of the palatal suture, including detecting while applying force to expand the palatal suture. For example, described herein are palatal expander devices comprising: a palatal expander body comprising a palatal region and a tooth-receiving region configured to receive teeth of the patient's upper arch; a sensor disposed on or in the palatal region of the palatal expander body; at least one processor configured to receive sensor data from the sensor and to determine an expansion state of a patient's palatal region based on the sensor data. The sensor may comprises one or more of: a force sensor, an optical sensor, a strain gauge, a capacitive electrode. The at least one processor may be disposed on or within the palatal expander body.

The at least one processor may be disposed on or within an electronic device remote from the palatal expander device. Any of these devices may include wireless communication electronics disposed on or within the first intraoral appliance or the second intraoral appliance, the wireless communication electronics being configured to transfer sensor data from the sensor to the at least one processor. The palatal expander body may comprise a polymeric shell having a plurality of teeth-receiving cavities. The at least one processor may evaluate a size of a mid palatine suture of the patient based on the sensor data. For example, the at least one processor may determine a change in deformation of the palatal expander device based on the sensor data. In some variations, the at least one processor determines an expansion force of the palatal expander device based on the sensor data.

Also described herein are methods of monitoring palatal expansion, the method comprising: receiving sensor data from one or more sensors on a palatal expander device, as the palatal expander device is worn by a patient, wherein the palatal expander device comprises a palatal expander body including a palatal region and a tooth-receiving region, wherein the one or more sensors are on or in the palatal region; monitoring, in one processors, the sensor data from the sensor to determine an expansion state of a patient's palate based on the sensor data; and outputting an indicator of the expansion state of the patient's palate.

Receiving sensor data may comprise receiving sensor data from one or more sensors comprises receiving sensor data from a pair of sensors positioned opposite the patient's palatal suture. Receiving sensor data may comprise receiving sensor data from one or more sensors comprises receiving sensor data from one or more optical sensors.

Receiving sensor data may comprise receiving sensor data from one or more sensors comprises receiving sensor data from one or more capacitive sensors. Monitoring may comprise monitoring over a time period of greater than one day (e.g., more than: 24 hours, 36 hours, 48 hours, 3 days, 4 days, 5 days, etc.). Monitoring may be continuous (e.g., at periodic intervals, e.g. 100 Hz, 10 Hz, 1 Hz, 1/min, every 2 min, every 3 min, every 5 min, every 10 min, every 30 min, every hour, etc.) or at discrete intervals (e.g., when requested by a user, etc.). As mentioned, any of these methods may include wirelessly transmitting the sensor data to the one or more processors.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figures 1A, 1B, 1C, 1D:
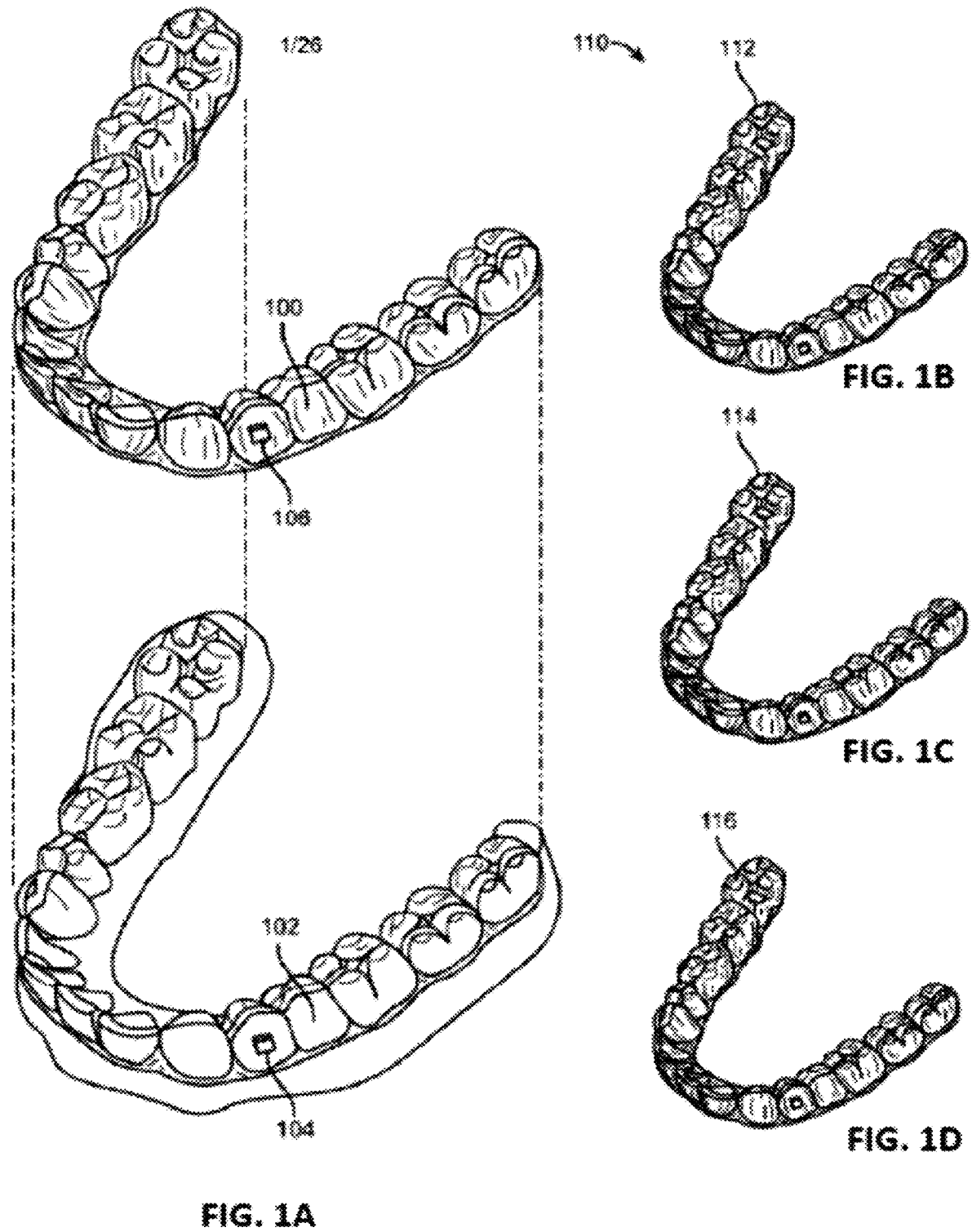
FIG. 1A illustrates an example of a tooth repositioning appliance.
FIGS. 1B-1D shows an example of a tooth repositioning system.

The orthodontic apparatuses described herein are configured to determine a state of the orthodontic apparatus based on sensor data. The state of the orthodontic apparatus typically refers to how well device is operating. For example the state of the orthodontic device may refer to the state of the orthodontic appliances's patient contact, including the extent and/or duration of contact with relevant portions of a patient's oral cavity (teeth, gingiva, palate, etc.) and/or contact with another orthodontic apparatus or another region of the orthodontic apparatus. The state of the orthodontic apparatus may alternatively or additionally refer to the state of integrity of the orthodontic appliance, including detecting and/or monitoring any damage or defects in the device (e.g., breakages, tears, cavities, etc.).

Any of the apparatuses described herein may be configured to monitor one or more of: the operation (including status, e.g., operational status) of an orthodontic appliance, and/or to monitor the user compliance for wearing an appliance, and/or to monitor the overall wear or condition of an orthodontic appliance, and/or to monitor the interaction between an appliance with the patient's anatomy, e.g., teeth, gingiva, palate, etc.

Generally, these apparatuses include one or more orthodontic appliance and one or more sensors on the orthodontic appliance that are configured to detect one or more parameters that may be used to determine the state of the orthodontic apparatus. The one or more sensors may be configured based on their position on and/or in the orthodontic appliance, and/or based on their shape and size, and/or based on the type of sensor. Any appropriate type of sensor may be used, including: electrical sensors (e.g., detecting capacitance, conductance, etc.), force sensors (e.g., detecting pressure, strain, etc.), thermal sensors, etc. Examples of sensors are provided herein. The sensors may be embedded within the orthodontic apparatus and oriented to sense properties of the orthodontic appliance directly, rather than the patient. For example, the sensors may be oriented away from the patient, toward the body of the orthodontic appliance.

Any of these apparatuses may include one or more processors configured to communicate with the one or more sensors. The processor(s) may be attached to and/or integral with the orthodontic appliance. For example the processor may receive sensor input from one or more of the sensors and may send control commands to activate/deactivate and/or modulate the sensors. The processor may control the timing of sensing. The processor may regulate the power. The processor may also include or be connected to a memory for storing the data (raw data and/or processed data). The processor may also be functionally connected to a communications module (e.g., wireless communications circuitry, such as Bluetooth, WiFi, etc.).

As will be described in greater detail below, the processor may analyze the sensor data from the one or more sensors to determine the state of the orthodontic apparatus. The analysis of the sensor data may be performed on the one or more processors attached to (on or in) the orthodontic appliance, or the one or more processors (including an additional off-appliance processor) may be used to analyze or further analyze the data to determine a state of the orthodontic appliance.

For example, an orthodontic apparatus may record sensor data from an intraoral appliance, such as dental/orthodontic aligners, including shell aligners. Data recorded by the orthodontic device may be stored in physical memory on the device and may be retrieved by another device. In particular, the data described may be retrieved by a hand held electronics communication device such as a smartphone, tablet, or the like. The handheld electronic device may include a user interface to augment communication between the orthodontic device and the electronic device, and may provide feedback to the user (e.g., patient) and/or technician, physician, dentist, orthodontist, or other medical/dental practitioner. Once transmitted to the handheld device, the data may be processed (or further processed) and/or passed on to a remote processor, memory and/or server.

As mentioned, the apparatuses and methods described herein for monitoring an orthodontic appliance (e.g., a removable intraoral appliances) may generate sensor data related to the intraoral appliance. The sensor data can be processed and analyzed to determine whether the appliance is functioning properly or has a defect. Additionally, the sensor data may be used to provide information about the state of the device. Advantageously, the apparatuses and methods described herein may provide an integrated electronic sensing and logging system capable of generating more reliable and accurate patient compliance data, which may be used by the treating practitioner to track the state of the orthodontic device and improve treatment efficacy. Additionally, the orthodontic devices described herein may provide high value sensing data useful for appliance design. In some embodiments, the sensing data provided by the orthodontic devices described herein may be used as feedback to modify parameters of an ongoing orthodontic treatment, also known as adaptive closed-loop treatment planning. For example, information about the contact between the appliance and the patient's oral cavity and/or about defects or wear in an appliance may be used to determine if a replacement or modified version of the appliance should be used.

As mentioned, in any of the methods and apparatuses described herein, all or some of the sensor data of the state of the orthodontic device may be used as feedback into a treatment plan, including the treatment plan in which the appliance from which the sensor data was collected is part of. For example, sensor data indicating the relative change in position and/or orientation of one or more portions of the appliance may be used to estimate and/or approximate movement of all or some of the patient's dentition, and this information may be used to modify the treatment plan, including the duration of one or more stages, the modification of one or more current and/or future stages, or the like. Any of these methods and apparatuses may provide feedback to a patient and/or user (e.g., doctor, dentist, orthodontist, technician, etc.) on the performance of the appliance and/or treatment plan. Feedback may be reported and/or implemented in real time or after some time delay.

In any of the methods and apparatuses described herein, the use of the one or more sensors for detecting a state of the orthodontic device may be used to refine a treatment plan. Refining of the treatment plan may include reducing or eliminating the number of modifications to an original treatment plan and/or an extension of the treatment plan duration (overall or incremental duration of one or more stages). For example, the use of one or more sensors to detect a state of the orthodontic device may provide feedback that may be used to adjust the treatment plan or one or more stages of the treatment plan on the fly, which may reduce the total overall number of adjustments necessary. In some variations, a treatment plan may be adjusted based on sensor data of a state of the orthodontic device to adjust further, subsequently worn, orthodontic appliances; if the sensor data indicates, for example, that a portion of the aligner is under strain or stress beyond an expected value, this may indicate that a tooth, group of teeth and/or palatal region are not moving in response to the force(s) being applied by the appliance(s). Thus, the system or apparatus may adjust the treatment plan accordingly, e.g., by wearing the appliance until the forces on the appliance and/or the relative positions or orientations of (all or regions of) the appliance are within a determined range, and/or by providing additional appliances that may address the change from an expected value.

An orthodontic apparatus may be any orthodontic device, system or the like, including in particular orthodontic appliances such as aligners, palatal expanders and/or mandibular repositioning apparatus. The orthodontic apparatuses described herein may be removable (e.g., removably by the patient) or they may be attached (e.g., by a dental professional). An orthodontic apparatus may include multiple orthodontic appliances, including an upper arch appliance and a lower arch appliance. In some variations the apparatuses and methods described herein may detect the interaction between multiple separate orthodontic appliances. Examples of each of these variations are described in detail below.

The various embodiments described herein can be used as part of or in combination with various types of intraoral appliances worn in a patient's mouth. The intraoral appliance may be an orthodontic appliance, such as an aligner or wire-and-bracket appliance, used to reposition one or more of the patient's teeth to a desired arrangement, e.g., to correct a malocclusion. Alternatively or additionally, the intraoral appliance may be used to maintain one or more of the patient's teeth in a current arrangement, such as a retainer. Other examples of intraoral appliances suitable for use in conjunction with the embodiments herein include, mouth guards, mandibular repositioning devices, and palatal expanders.

Appliances having teeth receiving cavities that receive and may reposition teeth, e.g., via application of force, are generally illustrated with regard to FIG. 1A. FIG. 1A illustrates an exemplary tooth repositioning appliance or aligner 100 that can be worn by a patient in order to achieve an incremental repositioning of individual teeth 102 in the jaw. The appliance can include a shell having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance.

Although appliances such as the ones shown in FIGS. 1A-1D may be referred to as polymeric shell appliances, the embodiments disclosed herein are well suited for use with many appliances that receive teeth, for example appliances without one or more of polymers or shells, or with partial tooth-receiving regions. The appliance can be fabricated with one or more of many materials such as metal, glass, reinforced fibers, carbon fiber, composites, reinforced composites, aluminum, biological materials, and combinations thereof for example. The appliance can be shaped in many ways, such as with thermoforming or direct fabrication (e.g., 3D printing, additive manufacturing), for example. Alternatively or in combination, the appliance can be fabricated with machining such as an appliance fabricated from a block of material with computer numeric control machining.

An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively or additionally, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some embodiments, some, most, or even all of the teeth may be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the URL "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Appliances such as the ones shown in FIG. 1A may also be used as a platform or support for other oral appliances that do not move teeth (or move teeth in addition to other therapeutic effect), but may, for example, adjust bite or re-shape the palate. For example a mandibular repositioning apparatus may include a pair of body regions also including a tooth-receiving cavities within shell-like structures (one for the upper jaw, one for the lower jaw) that are configured to secure over or onto a patient's teeth. The tooth-receiving portion may provide support against which other regions, such as positioning features, may brace. Similarly, a palatal expander apparatus may include one or more tooth-receiving portions in addition to a palatal region configured to be adjacent to the patient's palate.

FIGS. 1B-1D illustrate an example of a tooth repositioning system 110 (configured as a series of aligners) including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

The various embodiments of the orthodontic appliances presented herein can be fabricated in a wide variety of ways. As an example, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell. Alternatively or in combination, some embodiments of the appliances herein may be directly fabricated, e.g., using rapid prototyping, stereolithography, 3D printing, and the like.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

In some embodiments, orthodontic appliances, such as the appliance illustrated in FIG. 1A, when properly worn, may impart forces to the crown of a tooth and/or an attachment positioned on the tooth at one or more points of contact between a tooth receiving cavity of the appliance and received tooth and/or attachment. The magnitude of each of these forces and/or their distribution on the surface of the tooth can determine the type of orthodontic tooth movement which results. Tooth movements may be in any direction in any plane of space, and may comprise one or more of rotation or translation along one or more axes. Types of tooth movements include extrusion, intrusion, rotation, tipping, translation, and root movement, and combinations thereof, as discussed further herein. Tooth movement of the crown greater than the movement of the root can be referred to as tipping. Equivalent movement of the crown and root can be referred to as translation. Movement of the root greater than the crown can be referred to as root movement.

Figures 2, 3:
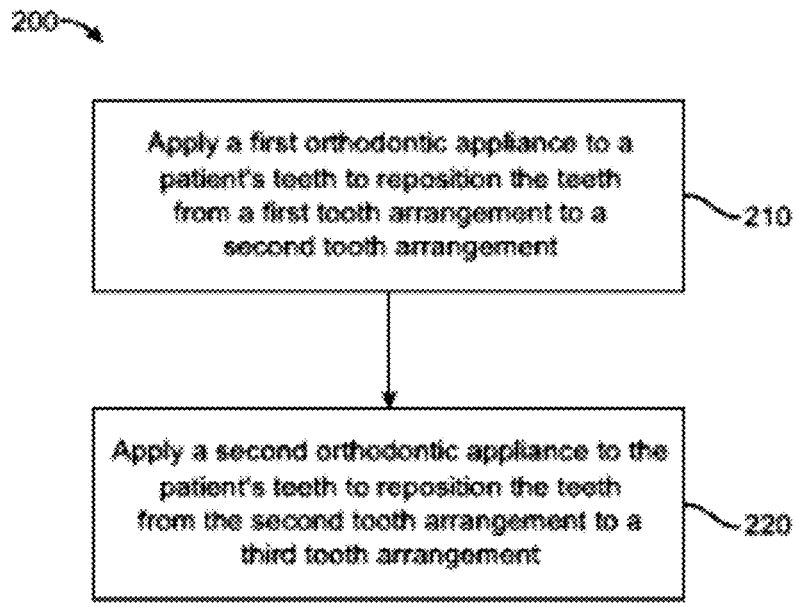
FIG. 2 illustrates a method of orthodontic treatment using a plurality of appliances.
FIG. 3 schematically illustrates an example of a monitoring apparatus (shown as an ECI device).

FIG. 2 illustrates a method 200 of orthodontic treatment using a plurality of appliances, in accordance with embodiments. The method 200 can be practiced using any of the appliances or appliance sets described herein. In step 210, a first orthodontic appliance is applied to a patient's teeth in order to reposition the teeth from a first tooth arrangement to a second tooth arrangement. In step 220, a second orthodontic appliance is applied to the patient's teeth in order to reposition the teeth from the second tooth arrangement to a third tooth arrangement. The method 200 can be repeated as necessary using any suitable number and combination of sequential appliances in order to incrementally reposition the patient's teeth from an initial arrangement to a target arrangement. The appliances can be generated all at the same stage or time point, in sets or batches (e.g., at the beginning of one or more stages of the treatment), or one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Predictable and effective tooth movement using an aligner such as those described above, however, may depend implicitly on good contact between the patient's teeth and the aligner. Thus, treatment efficacy may depend at least partially on fit, and the ability of the patient to properly wear the device, as well as the integrity of the apparatus itself. Thus, the methods and apparatuses described herein, which may detect and monitor these parameters, may improve patient treatment and outcomes.

An intraoral appliance can be operably coupled to a monitoring device configured to provide data related to a state of the intraoral appliance. Alternatively or in combination, the monitoring device can be configured to provide data indicative of one or more characteristics of the device, such as electrical parameters, elasticity, defects such as air bubbles or cracks, force applied by the appliance, or deformations of the appliance. The characteristics of the intraoral appliance can determine a state of the appliance.

The apparatuses described herein may include the oral appliance (e.g., aligner, palatal expander, etc.) and a status-monitoring sub-system including one or more of: sensors, processor, memory, communications circuitry (including an antenna), clock, power source (e.g., battery, capacitor, inductor, etc.), and connections and/or circuitry to communicate and/or coordinate between these components. The status-monitoring sub-system may be at least partially integrated into the oral appliance. For example, an apparatus as described herein can be configured for use in the patient's intraoral cavity by locating and sizing the monitoring sub-system for use within the oral cavity. For example, the dimensions of a monitoring device may be limited in order to avoid patient discomfort and/or facilitate integration into an intraoral appliance as discussed below. In some embodiments, a monitoring device has a height or thickness less than or equal to about 1.5 mm, or less than or equal to about 2 mm. In some embodiments, a monitoring device has a length or width less than or equal to about 4 mm, or less than or equal to about 5 mm. The shape of the monitoring device can be varied as desired, e.g., circular, ellipsoidal, triangular, square, rectangular, etc. For instance, in some embodiments, a monitoring device can have a circular shape with a diameter less than or equal to about 5 mm.

FIG. 3 schematically illustrates an orthodontic apparatus 300 including an intraoral appliance configured to be worn on one or more of the patient's teeth, gingiva, and/or palate 301 and a status-monitoring sub-system 302. The status-monitoring sub-system may include an electronics module ("ECI") 303 that connects or interfaces with one or more sensor(s) on the appliance. The orthodontic apparatus 300 can be used in combination with any embodiment of the systems and devices described herein, and the components of the orthodontic apparatus 300 may be equally applicable to any other embodiment of the orthodontic apparatuses described herein. All or a portion of the status-monitoring sub-system 303 of the orthodontic apparatus 300, such as the electronics module 303 can be implemented as an application-specific integrated circuit (ASIC) including one or more of: a processor 302, a memory 304, a clock 308, a communication unit 310, an antenna 312, a power management unit 314, or a power source 316. One or more sensors 306, may be included as part of (e.g., integrated with) the electronics, or it may be separate, and may be connected by one or more electric traces (e.g., wires or other traces). The processor 302

(e.g., a central processing unit (CPU), microprocessor, field programmable gate array (FPGA), logic or state machine circuit, etc.), also referred to herein as a controller, can be configured to perform the various methods described herein. The memory 304 encompasses various types of memory known to those of skill in the art, such as RAM (e.g., SRAM, DRAM), ROM (EPROM, PROM, MROM), or hybrid memory (e.g., flash, NVRAM, EEPROM), and the like. The memory 304 can be used to store instructions executable by the processor 302 to perform the methods provided herein. Additionally, the memory can be used to store sensor data obtained by the sensor(s) 306, as discussed in greater detail below.

The orthodontic apparatus 300 can include any number of sensors 306, such as one, two, three, four, five, or more sensors. In some embodiments, the use of multiple sensors provides redundancy to increase the accuracy and reliability of the resultant data. Some or all of the sensors 306 can be of the same type. Some or all of the sensors 306 can be of different types. Examples of sensor types suitable for use in the monitoring devices described herein include: touch or tactile sensors (e.g., capacitive, resistive), proximity sensors, audio sensors (e.g., microelectromechanical system (MEMS) microphones), color sensors (e.g., RGB color sensors), electromagnetic sensors (e.g., magnetic reed sensors, magnetometer), light sensors, force sensors (e.g., force-dependent resistive materials), pressure sensors, temperature sensors, motion sensors (e.g., accelerometers, gyroscopes), vibration sensors, piezoelectric sensors, strain gauges, pH sensors, conductivity sensors, gas flow sensors, gas detection sensors, humidity or moisture sensors, physiological sensors (e.g., electrocardiography sensors, bio-impedance sensors, photoplethysmography sensors, galvanic skin response sensors), or combinations thereof. In some embodiments, the sensors herein can be configured as a switch that is activated and/or deactivated in response to a particular type of signal (e.g., optical, electrical, magnetic, mechanical, etc.).

In any of the apparatuses and methods described herein a sensor may be configured to sensor or detect change in the orientation of the appliance and/or of one or more region of the appliance relative to one or more other regions of the appliance. For example, a sensor may be a gyroscope (e.g., a microelectromechanical systems ("MEMS") gyroscope or any other appropriate gyroscope and/or accelerometer, and/or any other appropriate motion sensor.

A sensor 306 can be located at any portion of an intraoral appliance, such as at or near a distal portion, a mesial portion, a buccal portion, a lingual portion, a gingival portion, an occlusal portion, or a combination thereof. A sensor 306 can be embedded within the appliance(s), including in any of these regions or portions. In embodiments where multiple sensors 306 are used, some or all of the sensors can be located at different portions of the appliance and/or intraoral cavity. Alternatively, some or all of the sensors 306 can be located at the same portion of the appliance and/or intraoral cavity.

An analog-to-digital converter (ADC) (not shown) can be used to convert analog sensor data into digital format, if desired. The processor 302 can process the sensor data obtained by the sensor(s) 306 in order to determine appliance usage and/or patient compliance, as described herein. The sensor data and/or processing results can be stored in the memory 304. Optionally, the stored data can be associated with a timestamp generated by the clock 308 (e.g., a real-time clock or counter).

The orthodontic apparatus 300 may include a communication unit 310 configured to transmit the data stored in the memory (e.g., sensor data and/or processing results) to a remote device. The communication unit 310 can utilize any suitable communication method, such as wired or wireless communication methods (e.g., RFID, near-field communication, Bluetooth, ZigBee, infrared, etc.). The communication unit 310 can include a transmitter for transmitting data to the remote device and an antenna 312. Optionally, the communication unit 310 includes a receiver for receiving data from the remote device. In some embodiments, the communication channel utilized by the communication unit 310 can also be used to power the device 300, e.g., during data transfer or if the device 300 is used passively.

The remote device can be any computing device or system, such as a mobile device (e.g., smartphone), personal computer, laptop, tablet, wearable device, etc. Optionally, the remote device can be a part of or connected to a cloud computing system ("in the cloud"). The remote device can be associated with the patient, the treating practitioner, medical practitioners, researchers, etc. In some embodiments, the remote device is configured to process and analyze the data from the monitoring apparatus 300, e.g., in order to monitor patient compliance and/or appliance usage, for research purposes, and the like.

The orthodontic apparatus 300 can be powered by a power source 316, such as a battery. In some embodiments, the power source 316 is a printed and/or flexible battery, such as a zinc-carbon flexible battery, a zinc-manganese dioxide printed flexible battery, or a solid-state thin film lithium phosphorus oxynitride battery. The use of printed and/or flexible batteries can be advantageous for reducing the overall size of the status-monitoring sub-system of the orthodontic apparatus 300 and avoiding patient discomfort. For example, printed batteries can be fabricated in a wide variety of shapes and can be stacked to make three-dimensional structures, e.g., to conform the appliance and/or teeth geometries. Likewise, flexible batteries can be shaped to lie flush with the surfaces of the appliance and/or teeth. Alternatively or in combination, other types of batteries can be used, such as supercapacitors. In some embodiments, the power source 316 can utilize lower power energy harvesting methods (e.g., thermodynamic, electrodynamic, piezoelectric) in order to generate power for the orthodontic device 300. Optionally, the power source 316 can be rechargeable, for example, using via inductive or wireless methods. In some embodiments, the patient can recharge the power source 316 when the appliance is not in use. For example, the patient can remove the intraoral appliance when brushing the teeth and place the appliance on an inductive power hub to recharge the power source 316.

Optionally, the orthodontic apparatus 300 can include a power management unit 314 connected to the power source 316. The power management unit 314 can be configured to control when the status-monitoring sub-system of the apparatus 300 is active (e.g., using power from the power source 316) and when the device 300 is inactive (e.g., not using power from the power source 316). In some embodiments, the orthodontic apparatus 300 is only active during certain times so as to lower power consumption and reduce the size of the power source 316, thus allowing for a smaller status-monitoring sub-system 302. In some embodiments, the orthodontic apparatus 300 includes an activation mechanism (not shown) for controlling when the status monitoring sub-system of the orthodontic apparatus 300 is active (e.g., powered on, monitoring appliance usage) and when the status monitoring sub-system of the orthodontic apparatus 300 is dormant (e.g., powered off, not monitoring appliance usage). The activation mechanism can be provided as a discrete component of the orthodontic device 300, or can be implemented by the processor 302, the power management unit 314, or a combination thereof. The activation mechanism can be used to reduce the amount of power used by the orthodontic apparatus 300, e.g., by inactivating the device 300 when not in use, which can be beneficial for reducing the size of the power supply 316 and thus the overall device size.

A sensor (or any other part of the status-monitoring sub-system) can be operably coupled to the intraoral appliance in a variety of ways. For example, the sensor can be physically integrated with the intraoral appliance by coupling the sensor to a portion of the appliance (e.g., using adhesives, fasteners, latching, laminating, molding, etc.), and/or embedding it within the apparatus (e.g., at the time of forming the apparatus or afterwards. For example, the coupling may be a releasable coupling allowing for removal of the monitoring device from the appliance, or may be a permanent coupling in which the monitoring device is permanently affixed to the appliance. Alternatively or in combination, the sensor can be physically integrated with the intraoral appliance by encapsulating, embedding, printing, or otherwise forming the monitoring device with the appliance. In some embodiments, the appliance includes a shell shaped to receive the patient's teeth, and the sensor is physically integrated with the shell. The sensor can be located on an inner surface of the shell (e.g., the surface adjacent to the received teeth), an outer surface of the shell (e.g., the surface away from the received teeth), or within a wall of the shell. Optionally, as discussed further herein, the shell can include a receptacle shaped to receive the sensor.

An orthodontic apparatus as described herein can include an intraoral appliance shaped to receive the patient's teeth, a first sensor disposed on or in the intraoral appliance, a second sensor disposed on or in the intraoral appliance, and at least one processor configured to receive sensor data from the first and second sensors and to indicate of a state of the orthodontic device based on the sensor data.

In general, the processor may be adapted or otherwise configured to receive and process the sensor data and use this sensor data to determine one or more parameters of the state of the orthodontic appliance that is part of the apparatus, such as the state of the orthodontic appliance's patient contact and/or the state of the orthodontic appliance's integrity. The processor may include non-volatile memory that contains instructions (e.g. software, firmware, etc.) for executing any of the steps described herein, including controlling the sensor(s) and receiving sensor data, and/or processing the data to determine a state of the appliance (e.g., the state of integrity of the appliance or the quality of contact with the patient). For example, the at least one processor can be configured to indicate that the orthodontic device is broken, worn, and/or deformed. Additionally, the processor can be configured to indicate that the orthodontic device has a defect. In some examples, the at least one processor is configured to indicate that the orthodontic device is applying an appropriate force to the patient's teeth. Additionally, the at least one processor can be configured to indicate a position of the first sensor relative to a position of the second sensor.

In any of the apparatuses described herein, the apparatus may determine if a first region (corresponding to a first sensor) is within a predetermined distance of a second region (corresponding to a second sensor), indicating the apparatus is being correctly worn and/or operated. For example, if the orthodontic device is a mandibular repositioning device, the processor can be configured to indicate that the first sensor is in close proximity to the second sensor, thereby determining if positioning features of the device are properly engaged.

Figure 4:
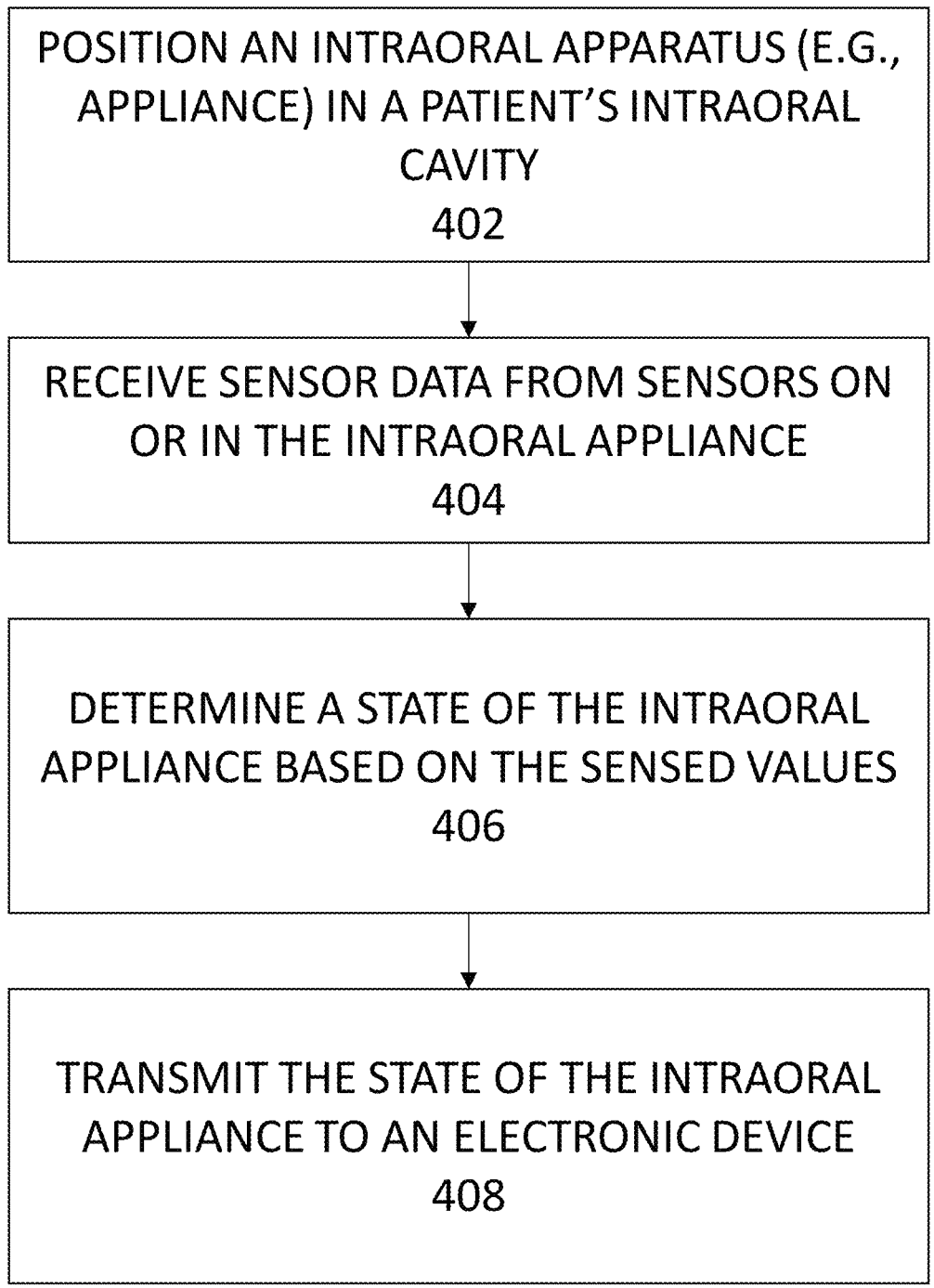
FIG. 4 illustrates a flowchart showing a method for monitoring an orthodontic device.

FIG. 4 illustrates a flowchart 400 showing an example of a method for monitoring an orthodontic apparatus to determine a state of an orthodontic appliance forming part of the apparatus (e.g., a state of the orthodontic appliance's patient contact and/or the state of the orthodontic appliance's state of integrity. At step 402 of flowchart 400, the method can include positioning an intraoral apparatus in the patient's intraoral cavity. The intraoral apparatus can include an appliance be shaped to receive the patient's teeth and can comprise a plurality of sensors each positioned within the intraoral appliance to sense a characteristic of the appliance. In some examples, the intraoral appliance is a dental aligner. The apparatus may include an upper arch aligner configured to receive the patient's upper teeth, and a lower arch aligner configured to receive the patient's lower teeth. In another example, the intraoral apparatus can include a mandibular repositioning appliance (e.g., device). The mandibular repositioning apparatus can include repositioning features configured to engage one another. In yet another example, the intraoral appliance can comprise a palatal expander device.

At step 404 of flowchart 400, the method can further include receiving a sensed value from each of the plurality of sensors. The sensed value can be a parameter sensed by any of a number of different types of sensors. For example, a capacitive sensor may provide a capacitance value, a magnetic sensor may provide an orientation or magnitude of a magnetic field, an optical sensor may provide an output current corresponding to sensed light intensity (at a particular frequency or range of frequencies), a force sensor or strain gauge may provide a force value, and an ultrasonic sensor may provide the duration of a return pulse. These sensed values may be transmitted to a processor in the appliance (or separate from the appliance) and used to determine parameter indicating the state of the appliance. For example, at step 406 of flowchart 400, the method can include determining a state of the orthodontic device based on the sensed values. For example, in one example the determining step comprises determining if a first portion of the intraoral appliance is aligned properly with respect to a second portion of the intraoral appliance. In another example, the determining step comprises determining if the intraoral appliance is deformed. In yet another example, the determining step comprises determining if the intraoral appliance has a defect. In an additional example, the determining step comprises determining if the intraoral appliance is applying an appropriate force to the patient's teeth. In another variation, determining includes determining if the appliance is properly seated on the patient's teeth, gingiva and/or palate. In any of the apparatuses (devices and systems) described herein, one or more optical sensors may be used to detect movement and/or position of one or more regions of the apparatus relative to other regions. For example, an optical sensor may be used to detect expansion of a palatal expander/arch expander.

One the processor has determined one or more parameters indicative of the state of the apparatus, the apparatus may transmit the state of the apparatus 408 and/or the parameters to a remote device for display, storage and/or further transmission. For example the apparatus may transmit to a mobile device held by the patient (e.g., phone, smartphone, tablet, etc.) and/or to a dental professional (dentist, orthodontist, etc.).

Figure 5A:
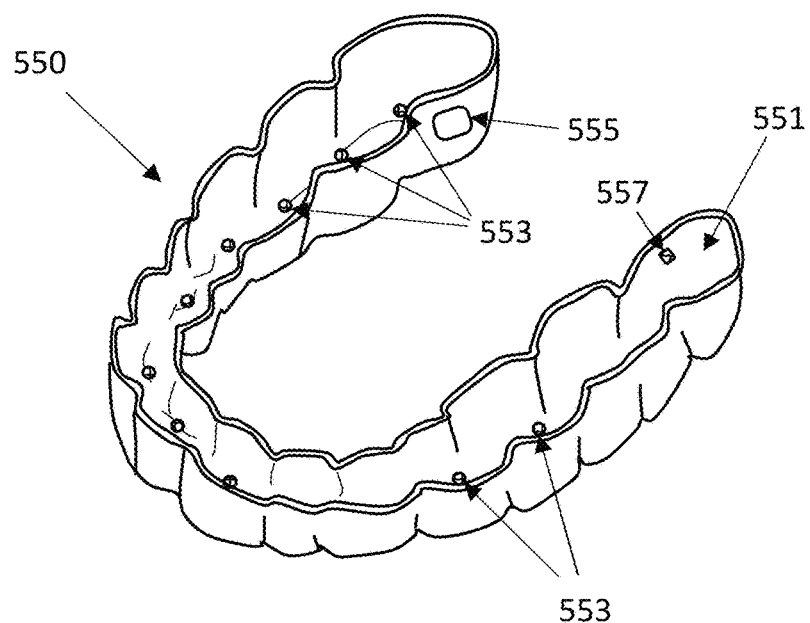
FIG. 5A shows a first example of an apparatus including an aligner appliance configured to determine and/or monitor a state of the aligner.

FIG. 5 shows a first example of an apparatus comprising an orthodontic device configured to determine, monitor and indicate a state of the orthodontic device. In this example the orthodontic device is an aligner (e.g., a shell aligner) that is shaped to receive the patient's teeth. The aligner 550 includes a tooth-receiving region 551. This tooth receiving region may be a channel configured to substantially conform to the patient's teeth. The channel may have connected chambers each comprising a negative impression of one of the patient's teeth (buccal, lingual and occlusal sides). The chambers may be formed from a scan or impression of the patient's teeth, and may be arranged so as to apply force to reposition one or more of the patient's teeth when worn. In this example, the apparatus may be configured to detect and/or monitor and/or indicate the state of the aligner, and more specifically, the state of the orthodontic appliance's patient contact. As shown in FIG. 5A, a plurality of sensors 553 are shown within the occlusal channel of the tooth-receiving region 551. These sensors are configured to detect contact or proximity with a tooth received in each region (e.g., chamber) of the aligner. For example, each sensor may include a capacitive sensor, or a pair of electrodes configured to detect capacitance; proximity to the sensor(s) may be detected by the sensor which may each return a value (e.g., a voltage or current level based on the capacitance detected) corresponding to the proximity of a tooth when the apparatus is being worn. In operation, this arrangement, in which sensors configured as proximity or contact sensors are arranged in the deepest part of the tooth-receiving region 551, as shown in FIG. 5A, may provide a range of values that may be used to determine if the aligner is fully and properly seated on all of the patient's teeth. These sensors may be pairs of sensor emitters and sensor receivers, or they may be combined emitters/receivers. In some variations sensor emitters may be adjacent to sensor receivers.

The apparatus in FIG. 5A may also include any of the sub-systems for determining the state of the orthodontic appliance (e.g., aligner). In FIG. 5A, for example, the apparatus includes the plurality of sensors 553, that are each connected (via a conductive trace, wire, etc.) to a housing 555 enclosing one or more of: processor, memory, communications circuitry (e.g., antenna), clock, power source (e.g., battery, capacitor, inductor, etc.). Although capacitive sensors (touch sensors) are shown in FIG. 5A, any appropriate type of sensor may be used, or multiple types of sensors.

In FIG. 5A, the processor(s) may be configured to receive values (capacitance values) from the sensor(s), and may control applying energy to the sensors to determine the capacitance values. The processor may process the individual sensors for an array of different positions corresponding to different teeth and/or regions of the aligner. The array of values may be compared to a threshold value or range of values to determine how well the tooth/teeth are seated at each position. The values may be normalized by one or more normalization sensors 557 (e.g., additional touch sensors) located more laterally (e.g., lingually or buccally) on the aligner. Thus, the processor may be configured to receive sensor data from the first and second sensors and to indicate of a state of the orthodontic device based on the sensor data. The state of the aligner may indicate that the aligner is well seated (with the touch sensors are above a threshold value), poorly seated (which may be a single value or a gradation of values, depending on how deeply the teeth are seated in some or all of the chambers forming the tooth-receiving region), or unseated (when not worn). Thus, although the compliance information (worn/not worn) may be provided by this apparatus, these apparatuses may also provide a great deal of additional information about how well the apparatus may be operating, including how well the device is seated or applied. In some variations the parameters indicating the state of the aligner may include a map showing how well the appliance is/was seated over the dental arch; a time course for seating information may be recorded and reviewed (e.g., over a single night/days use, etc.).

Figure 5B:
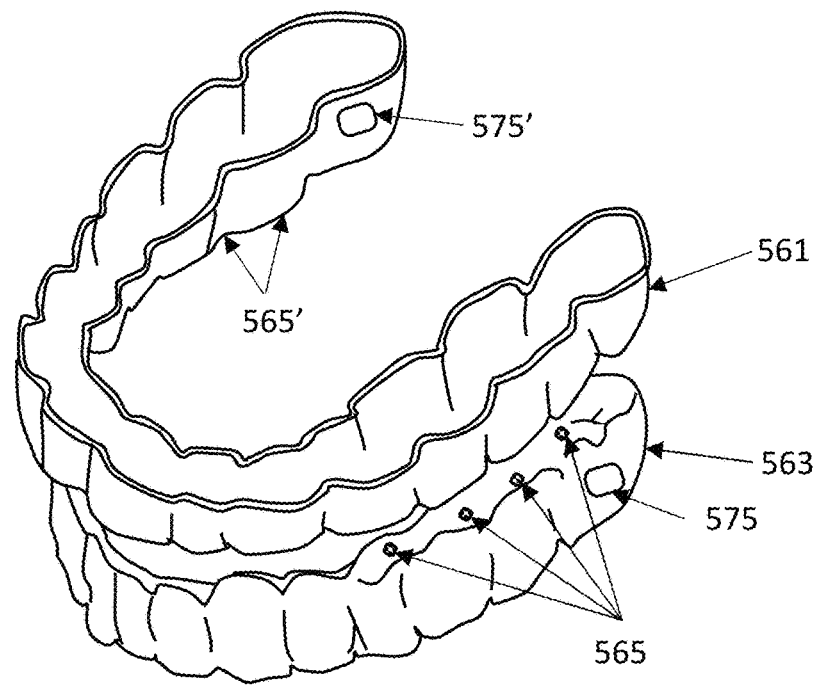
FIG. 5B shows a second example of an apparatus including a pair of (upper arch, lower arch) aligners configured to determine the state of the aligner.

FIG. 5B is another example of an apparatus configured to determine the state of one or more appliances forming the apparatus. In FIG. 5B, the apparatus includes a pair of aligners, an upper arch 561 aligner and a lower arch 563 aligner. This apparatus may be configured to detect intercuspation between the upper and lower aligners. In this example, the lower aligner 563 includes a plurality of sensors 565 that may detect contact with predetermined locations on the upper aligner. For example the upper aligner may also include a plurality of sensors 565' that, when a particular specific intercuspation is achieved, may return a value. In some variations the upper sensors 565' may be sensor emitters and the lower sensors 565 may be sensor receivers (or vice versa); in some variations a mixture of complementary sensor receivers and sensor emitters may be distributed between the upper and lower appliances. In some variations compound sensors (e.g., both sensor emitter/sensor receiver sensors) may be used. The value(s) may be tracked (as an array, correlated to location) and may be determined over time. The processor may analyze the values to determine the quality of the contact between the upper and lower jaws when wearing the aligners. As in FIG. 5A, either or both upper and lower aligners may include any of the sub-systems for determining the state of the orthodontic appliance (in this example, intercuspation between the two appliances), which may be duplicated between the two aligners, or may be divvied between them. In FIG. 5B separate housings 575, 575' may enclose separate processors, power sources, etc. and these two sub-systems may communicate with each other.

Figure 6A:
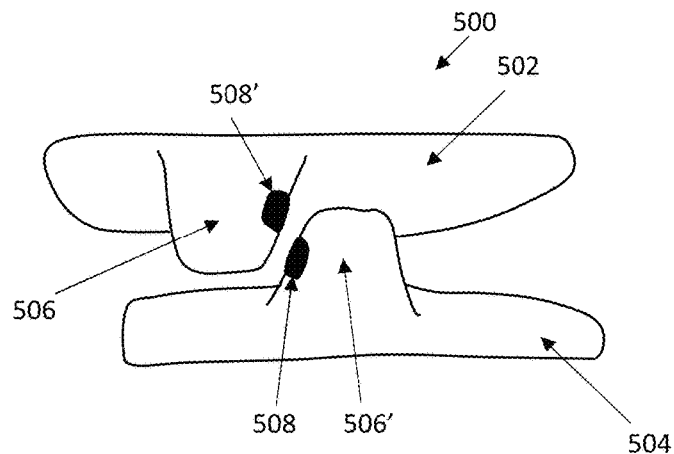
FIGS. 6A-6B illustrate one embodiment of an orthodontic device comprising a mandibular repositioning device.
Figure 6B:
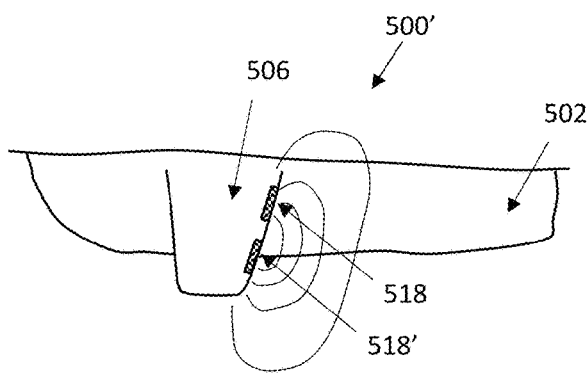

FIGS. 6A-6B illustrate one embodiment of an orthodontic apparatus as described herein comprising a mandibular repositioning appliance 500. The mandibular repositioning appliance 500 can comprise first and second intraoral appliances 502, 504 (which may be part of a shell aligner configured to secure to the teeth and/or may reposition them, and may be configured to receive the patient's upper and lower teeth, respectively. Each of the intraoral appliances may include a positioning feature 506, 506' that are configured to engage with each other. The interaction between the positioning features may drive the jaw (e.g., the patient's lower jaw) to provide orthodontic effect. At least one positioning feature in the apparatus may include at least one sensor 508. In FIG. 6A, both the upper and lower positioning features include sensors. These sensors may detect contact and/or proximity between the opposite positioning features, and provide information on the proper functioning of the apparatus, e.g., engagement between the positioning features from the correct sides/locations. In FIG. 6A, the orthodontic apparatus can further include at least one processor and any of the additional components of the sensing sub-systems, as described in more detail above.

FIG. 6B is an alternative view of a first or upper appliance 502' for an intraoral apparatus 500', including a positioning feature 506. The positioning feature can include a sensor 508; in this example, the sensor includes two portions (e.g., a pair of electrodes 518, 518'). The sensor can be any type of sensor as described herein. For example, the sensor can be a capacitive sensor, a magnetic sensor, a force sensor, a push button sensor, a resistive sensor. As mentioned above, these sensors may be configured as sensor emitters/sensor receivers or pairs of sensor emitters/sensor receivers.

Referring back to FIG. 6A, the sensors of the first and second intraoral appliances can provide sensor data to the processor. The processor can be configured to use the sensor data to determine a state of the mandibular repositioning apparatus. For example, the sensor data can be used to determine if the positioning features of the first and second intraoral appliances are properly engaged. Sensors on the mating surfaces of the positioning features can detect contact between the upper and lower positioning features. More sophisticated sensors can detect distance between the positioning features, in addition to contact.

Figure 6C:
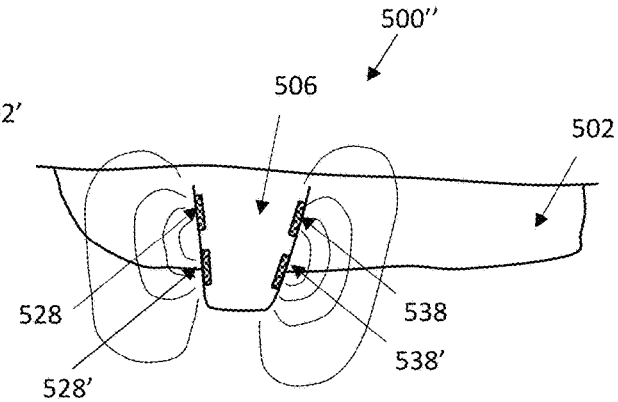
FIGS. 6C-6E show an example of a mandibular repositioning device that can detect both proper engagement and reverse engagement of positioning features.
Figure 6D:
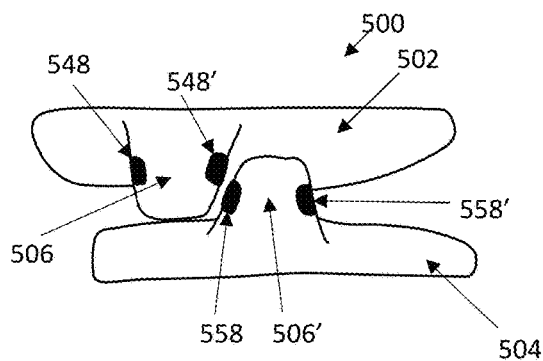
Figure 6E:
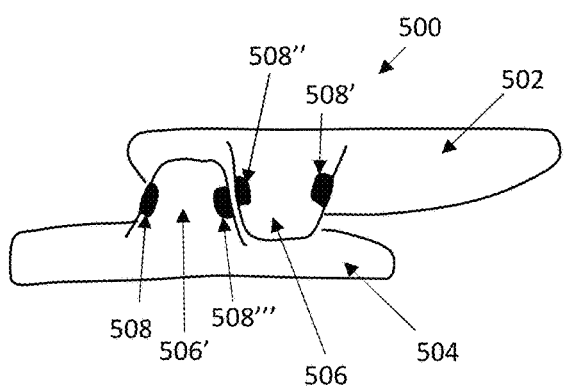

FIGS. 6C-6E show an example of a mandibular repositioning apparatus 500″ that can detect both proper engagement of positioning features, as described above (and shown in FIG. 6D), and reverse engagement, as shown in FIG. 6E. In the example of FIG. 6C sensors 528, 528′, 538, 538′ are positioned on opposite sides of the positioning features 506. FIGS. 6D and 6E illustrate operation of a mandibular repositioning apparatus. In FIGS. 6D and 6E sensors 548, 548′ and 558, 558′ are located on either side of each positioning feature 506, 506′. The processor can then determine which of the sensors are in contact or in close proximity to determine if the mandibular repositioning device is properly engaged (FIG. 6D) or reverse engaged (FIG. 6E).

The sensors of the mandibular repositioning apparatus can further comprise additional sensors, such as sensors configured as compliance indicators (e.g., temperature sensors or accelerometers to give an indication of head position and whether the appliances are being worn, etc.). The processor(s) may be configured to use the additional compliance indicators to determine that engagement is being assessed only when the appliances are worn by the patient. The mandibular repositioning apparatus 500 may therefore be configured to detect compliance and proper use by detecting engagement of the positioning features while the appliances are being worn by the patient.

Figure 7:
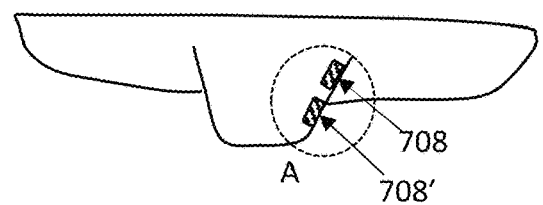
FIG. 7 is an example of portion of a mandibular repositioning apparatus including an engagement feature having a pair of sensors (e.g., capacitive sensors).
Figure 7A:
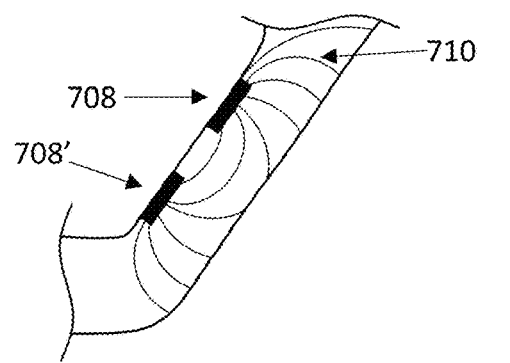
FIGS. 7A-7B illustrate operation of the sensors of the mandibular repositioning apparatus shown in FIG. 7 (enlarged) configured to assess device quality.
Figure 7B:
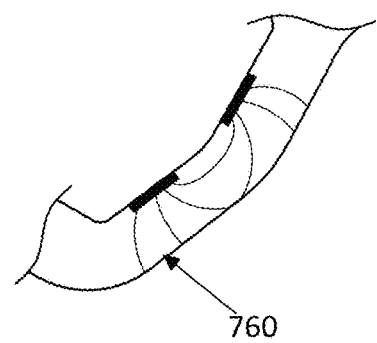

FIG. 7 illustrates another example of a portion of a mandibular repositioning apparatus, including a sensor (configured as a pair of electrodes 708, 708′). Referring to FIGS. 7A-7B, the sensor 708, 708′ of an orthodontic apparatus can also be used to assess device quality (e.g., structural integrity, defects, etc.). For example, large unsupported thermo-formed features, like the mandibular positioning features of FIGS. 6A-6E, may deform during treatment. Sensors (such as capacitive sensors) can be used to detect the deformation of the intraoral appliance. Referring to FIG. 7A, the appliance can include one or more capacitive sensors 708, 708′ that sense static electric field lines 710. In FIG. 7B, the capacitive sensors are able to detect changes in the electric field that the processor may use to determine that the appliance is bent or deformed by sensing changes to the static electric field lines.

Figure 8:
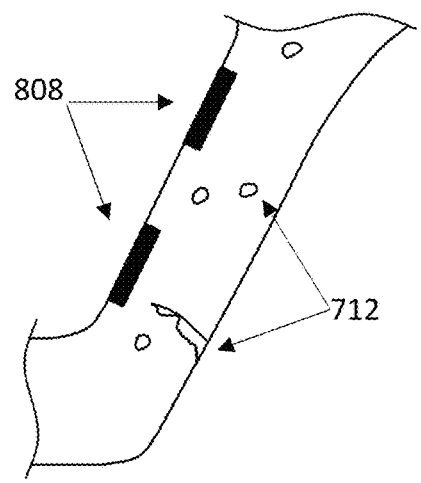
FIG. 8 illustrates a dental appliance with sensors that can detect defects in the appliance.

Additionally, the sensors can be used to detect defects within the appliance, such as air bubbles or cracks. Referring to FIG. 8, sensors 808 in the appliance can detect the relative permittivity; the processor receiving this value may, over time, detect changes in the relative permittivity of the appliance material resulting from air bubbles or cracks in the appliance. The processor may include one or more thresholds indicating use and/or defect. In FIG. 8, the defects 712 are inclusions or manufacturing defects; defects may develop with use and/or with storage, including delamination of different layers of the device, tearing of the device, inclusion of air bubbles, etc. These defects may negatively impact the appliance performance and/or fit. In some variations the appliance may include a material that may adversely take up water (saliva), particularly in regions that are supposed to remain sealed off. For example, a sealed region for holding electrical components (batteries, wires, electronics, etc.) may be inadvertently opened, exposing it to saliva; one or more sensors may detect this failure mode and alert the patient and/or caregiver. In variations including a mandibular repositioning feature, for example, a cavity or region of the appliance (e.g., in a hollow region) may collect saliva, which may be undesirable (e.g., allowing bacterial growth, etc.). One or more sensors may detect the collection of fluid. Alternatively or additionally, any of these apparatuses may include one or more sensors configured to detect bacterial growth or other contamination.

In any of these variations, the appliance may include one or more temperature sensors that may be used to monitor storage temperature. A temperature sensor on the device may be configured to monitor temperature of the device to indicate that the storage temperature does not exceed a range for safe storage (e.g., greater than 120 degrees F., greater than 125 degrees F., greater than 130 degrees F., greater than 140 degrees F., greater than 150 degrees F., greater than 160 degrees F., greater than 170 degrees F., etc., and/or less than 50 degrees F., less than 40 degrees F., less than 30 degrees F., less than 20 degrees F., less than 10 degrees F., less than 5 degrees F., less than 0 degrees F., etc.).

Thus, the apparatuses and methods described herein may be used with any one or more of the palatal expanders and/or arch expanders. For example, the methods and apparatuses described herein may generally be used to monitor the operation (including status, e.g., operational status) of an appliance including, but not limited to a palatal expander, and/or to monitor the user compliance for wearing an appliance including, but not limited to a palatal expander, and/or to monitor the overall wear or condition of an orthodontic appliance, including, but not limited to a palatal expander and/or to monitor the interaction between an appliance including, but not limited to a palatal expander, with the patient's anatomy, e.g., teeth, gingiva, palate, etc.

Figure 9A:
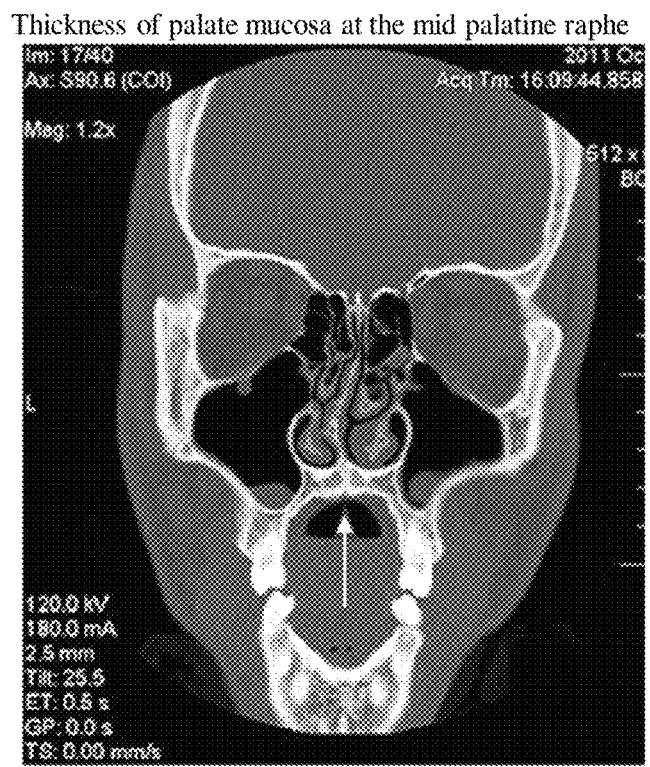
FIG. 9A is an example of a scan through a patient's head, showing a thickness of palate mucosa at the mid palatine raphe; in some variations, the apparatuses described herein may be configured as palatal expanders including one or more sensors. The sensors may be configured to determine the thickness of this mid palatine raphe region and/or the status of the palatal expander.
Figure 9B:
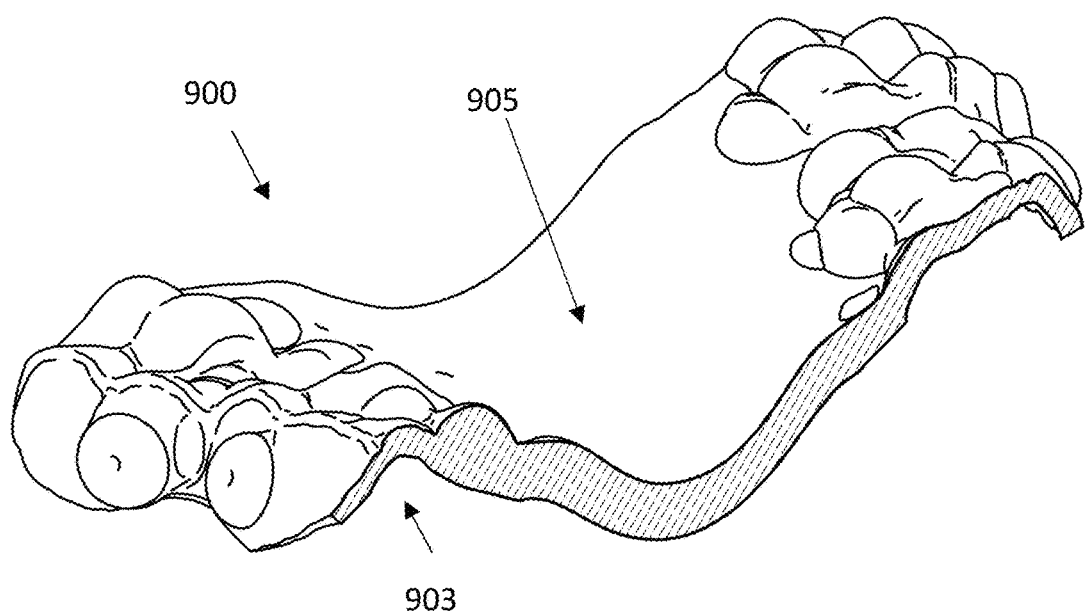
FIG. 9B is an example of a palatal expander apparatus that may be adapted to include one or more sensors for determining a property of the palate and/or the status of the palatal expander, as described herein.

FIGS. 9A-9B illustrate a palatal expander that may be configured to monitor and/or determined compliance (e.g., patient compliance in wearing the apparatus) and/or the state of the appliance. For example, FIG. 9A illustrates a scan through a patient's head, showing mucosa tissue at the mid palatine raphe (arrow). In this region, the tissue may be very thin and the apparatuses described herein may be configured to determine the palatal suture opening stages using a capacitive electrode. For example, an electrostatic field may be formed by capacitive electrodes at the soft palate region. Using this technique, a palatal expander can be monitored during the treatment without need to take CTs. FIG. 9B shows an example of a palatal expander formed, similar to an aligner, to include a tooth-retaining region 903 (regions on either side of the device may be configured to conform to a patient's molars and/or premolars) and a palatal region 905 that may be configured to sit adjacent to the palate and apply force on the lingual side of the teeth and/or lateral palate to spread the suture.

FIGS. 10A-10F show examples of a palatal expander device 1000 that can include any number or type of sensor(s) 1008 to monitor the operation of the palatal expander, to monitor the user compliance for wearing the palatal expander, to monitor the overall wear or condition of the palatal expander, and/or to monitor the interaction between the palatal expander and the patient's anatomy. Any of these sensors may be configured as sensor emitters and/or sensor receivers as described herein.

Figure 10A:
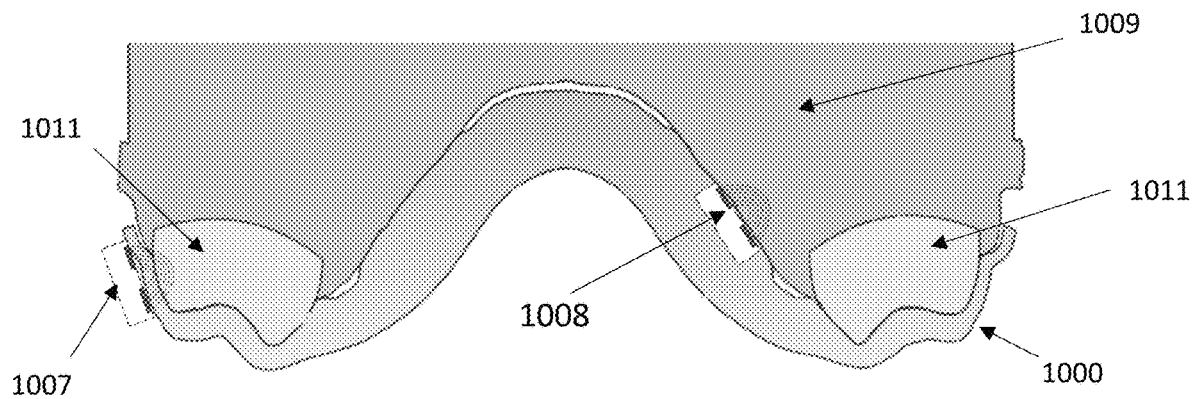
FIGS. 10A-10F show examples of a palatal expander device that can include any number or type of sensor to determine an expansion state of the palatal expander device based on sensor data.

For example, FIG. 10A illustrates a section through an exemplary palatal expander 1000 worn on a subject's dental arch 1009, including region worn on the teeth 1011. In this example, the sensors (two pairs of sensors 1007, 1008 are shown) may be used to determine an expansion state of the palatal expander device based on sensor data. In FIG. 10A, the sensor pairs may detect compliance for wearing the palatal expander; either or both the first sensor pair 1007 and the second sensor pair 1007 may be capacitive sensors that can detect a change in the field between any of the sensors in the pair(s). Thus, for example, when the patient is wearing the palatal expander the sensor(s), which may be electrodes, may determine a change in the capacitance across the pairs consistent with the dental tissue, as compared to air or just water. Alternatively, in some variations the palatal expander may detect a change in the capacitance between an electrode in the first pair 1007 and an electrode in the second pair 1008 that may indicate a change in the structural integrity of the palatal expander. Any of the apparatuses may include a data processing unit (e.g., an electronic module, not shown) that connects to the sensor(s) and may provide power and receive and/or process signals from the sensors. The electronic monitor(s) may log the data (e.g., be configured as a data logger), process the data and/or transmit the data, e.g., to a remote processor, including a remote server. The apparatus, including a data processing unit may store and/or monitor the use of the appliance over time, including alerting the user, a caregiver and/or the patient if the appliance is not being worn for a prescribed duration.

Figure 10B:
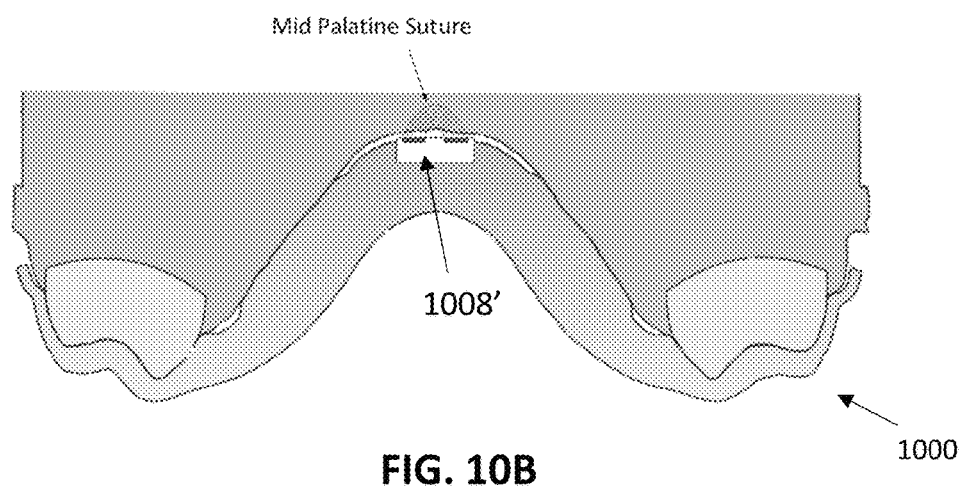

FIG. 10B illustrates an example of a palatal expander apparatus including one or more sensors configured to monitor the interaction between the palatal expander and the patient's anatomy. In FIG. 10B, the sensor may comprise an optical sensor 1008' (e.g., including in some variations an emitter and a detector) that may determine one or more of: the distance to the tissue (e.g., the palate), and/or the suture opening, based on light contrast between soft-hard tissue and/or the blood stream. In some variations, an ultrasonic sensor may be used. The apparatus, including any data processing unit (not shown) may store and/or monitor a change in the relationship between the patient's tissue and the appliance over time. For example the apparatus may monitor the movement/expansion of the palatal suture opening as the palatal expander operates, and/or the change in the distance between the apparatus and the palate over time. This data may be analyzed locally (e.g., in the data processing unit) or remotely and may be used as feedback to the patient, user and/or caregiver and/or may be used as feedback into an orthodontic treatment plan, including modifying an orthodontic treatment plan.

Figure 10C:
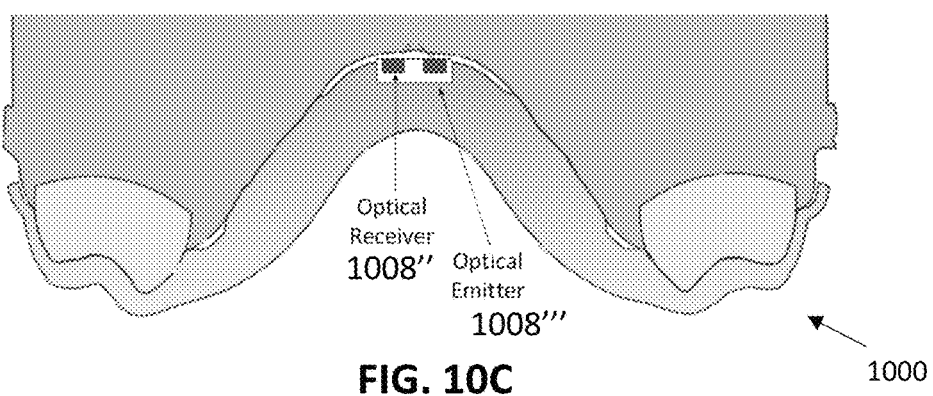

The palatal expander device 1000 of FIG. 10C shows another example of an apparatus including a sensor for detecting the relationship between the apparatus and the patient's tissue. As mentioned, this sensor may comprise a plurality of capacitive electrodes, and/or in some variations, the sensor may include an optical sensor (e.g., an optical receiver 1008" and an optical transmitter 1008"), as shown. This apparatus may be configured to detect the extent of the mucosa tissue at the mid palatine raphe, allowing the processor to detect the mid palatal suture opening when the sensor applied an electrostatic field using the capacitive electrodes on the appliance, positioned opposite from the soft palate region, as described in FIG. 10B. Using this technique the palatal expansion can be monitored during the treatment without need to take CTs. In general, the apparatuses and methods described herein, in particular the palatal expanders, may allow direct monitoring, in real time, of the suture.

Figure 10D:
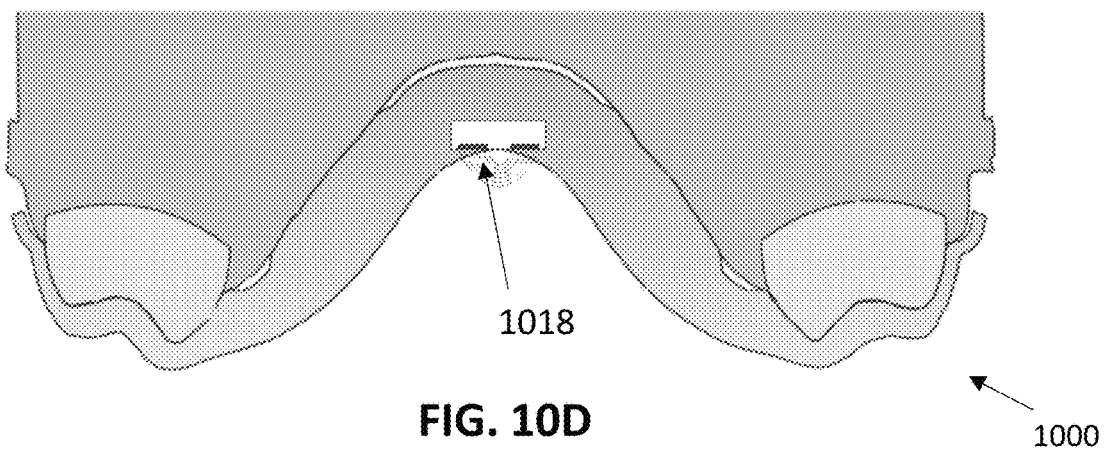

FIG. 10D is an example of a palatal expander apparatus configured to monitor the operation of the palatal expander. In FIG. 10D, a sensor 1018 may include one or more capacitive electrodes configured to provide values that can be used by the processor to monitor the change in the deformation of palatal expander; this information may be used, e.g., to determine how much and at what rate the expansion happens. This can be measured by tracking the change of capacity measured between the capacitive sensor electrodes in the expander device. The sensor may be positioned on palatal expander in a way that the distance between the capacitive electrodes changes while the expansion happens. For example, the sensor 1018 can be placed midline of trans-palatal segment. Ultrasonic sensors can also be used an alternative to capacitive electrodes to track the expansion of the palatal expander. Alternatively or additionally, in some variations the sensor(s) may be configured to measure the operation of the apparatus to determine if the palatal expander includes an breaks, cracks, wear, etc., and my thus monitor the overall wear or condition of the palatal expander.

Thus, any of the apparatuses described herein may be configured to detect a failure (e.g., failure mode) of the apparatus, such as a palatal expander apparatus. For example, a palatal expander such as those described herein, may fail if the palatal region deforms under the force (pressure) exerted on the apparatus when inserted into the patient's mouth. One or more sensors on the apparatus, such as those described in reference to FIG. 10D, may detect the deformation, based, e.g., on the position of various regions of the device relative to each other, such as the position of the left half of the palatal region relative to the right half.

Figure 10E:
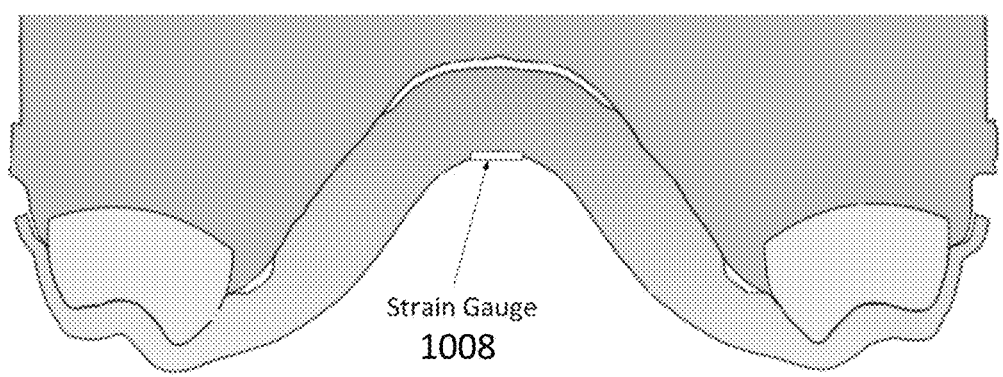
Figure 10F:
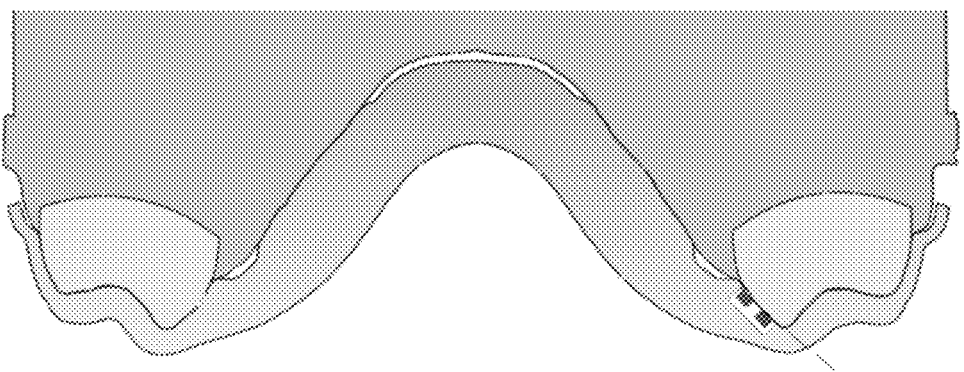

FIG. 10F illustrates another example of a palatal expander apparatus configured to monitor the operation of the palatal expander. The device shown in FIG. 10F may be used to directly detect the force applied by the apparatus, e.g., if no force is applied or if lower than an expected threshold (e.g., lower than 8 N) is being applied. In FIG. 10F, the apparatus includes a sensor 1028, such as a strain gauge, that detects stain on the palatal expander, or a region of the palatal expander, such as, e.g., the palatal region configured to be worn adjacent to the patient's palate. In some variations the forces acting on the apparatus may be stored, analyzed and/or transmitted by a data processing unit (not shown); for example the apparatus may be configured to monitor force across the apparatus which may be representative of the forces applied by the patient's teeth and/or palatal region when the device is worn; it may be expected that as the patient's teeth and palate adjusts and adapts to the appliance, these forces may be reduced in an expected manner, e.g., within a predictable fashion. Thus, the sensor values may be analyzed to determine a change in the values over time, indicative of wear (e.g., compliance, when the device is worn in the patient's mouth) and/or operation of the appliance, e.g., when the appliance is moving the teeth and/or palate. The rate of change in the force(s) applied may be within a predicted range indicating effective treatment, or outside of the predicted range (lower, and/or in some cases higher) than expected may indicate a problem in the treatment, particularly if the absolute force applied is higher than an expected value.

In some of these apparatuses, the one or more sensors may be configured to detect compliance (e.g., patient wearing of the apparatus) when the sensor(s) are directed to infer wearing of the device based on the change in sensor value(s) when monitoring the sensor itself. This may be particularly beneficial as compared to direct compliance measurements, in which the relationship between the apparatus and the patient, and particularly a sensor and the patient, may be variable, making reliable contact difficult; the internal anatomy of the mouth, including teeth, gingiva and palate, may be complex, making some sensors, such as flat electrodes, difficult to reliably operate. The method and apparatuses described herein may avoid these problems. In general, the variations described herein that may be used to monitor or measure compliance, may also be configured to monitor the quality of the compliance, including how well the apparatus is worn, or fit, in the patient's mouth. Improper fit may be detected from the sensor values, if they are outside of expected parameter ranges, particularly when wearing the device.

Referring to FIGS. 10E and 10F, a sensor may be, e.g., a strain gauge or force sensors and can be placed at force application regions, such as the lingual side of crowns, or the palatal contact regions, to monitor expansion force of the palatal expander device. The sensor data from the strain gauges or force sensors can be used to determine an expansion state of the device.

In some of these apparatuses, the one or more sensors may be configured to detect compliance (e.g., patient wearing of the apparatus) when the sensor(s) are directed to infer wearing of the device based on the change in sensor value(s) when monitoring the sensor itself. This may be particularly beneficial as compared to direct compliance measurements, in which the relationship between the apparatus and the patient, and particularly a sensor and the patient, may be variable, making reliable contact difficult; the internal anatomy of the mouth, including teeth, gingiva and palate, may be complex, making some sensors, such as flat electrodes, difficult to reliably operate. The method and apparatuses described herein may avoid these problems. In general, the variations described herein that may be used to monitor or measure compliance, may also be configured to monitor the quality of the compliance, including how well the apparatus is worn, or fit, in the patient's mouth. Improper fit may be detected from the sensor values, if they are outside of expected parameter ranges, particularly when wearing the device. Any of the apparatuses described herein may be, for example, configured to detect a retention force of an appliance (e.g., aligner, palatal expander, etc.) on the patient's teeth.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for monitoring a status of one or more oral appliances, the method comprising:
    collecting sensor data using one or more sensor receiver and emitter pairs, each of the one or more sensor receiver and emitter pairs including a sensor receiver on or in a first portion of the one or more oral appliances and a sensor emitter on a second portion of the one or more oral appliances, wherein each sensor receiver receives a signal emitted by a corresponding sensor emitter;
    determining the status of the one or more oral appliances based on the sensor data, wherein the status includes one or more of: user compliance, condition of the one or more oral appliances, and effectiveness of the one or more oral appliances; and
    determining whether to modify a treatment plan implemented by the one or more oral appliances based on the determined status of the one or more oral appliances.

2. The method of claim 1, wherein the sensor data relates to one or more of: a position of the one or more oral appliances, an orientation of the one or more oral appliances, contact between the one or more oral appliances and a patient's oral cavity, a defect of the one or more oral appliances, and wear of the one or more oral appliances.

3. The method of claim 1, wherein the sensor data includes a force measurement between the one or more oral appliances and a patient's oral cavity measured by the one or more sensor receiver and emitter pairs.

4. The method of claim 1, wherein the determining the status of the one or more oral appliances includes determining movement of one or more teeth.

5. The method of claim 1, wherein the one or more sensor receiver and emitter pairs includes multiple sensor receiver and emitter pairs at different regions of the one or more oral appliances, wherein the sensor data includes force measurements between the one or more oral appliances and a patient's oral cavity measured by the multiple sensor receiver and emitter pairs, wherein determining the status of the one or more oral appliances includes determining a distribution of the measured forces.

6. The method of claim 1, wherein determining the status of the one or more oral appliances and determining whether to modify the treatment plan is performed by at least one processor on or in the one or more oral appliances.

7. The method of claim 1, further comprising transmitting the sensor data to an external device.

8. The method of claim 1, wherein determining whether to modify the treatment plan includes one or more of: determining whether to modify a duration of one or more stages of the treatment plan, and determining whether to replace the one or more oral appliances.

9. The method of claim 1, further comprising using the one or more sensor receiver and emitter pairs to monitor progress of one or more of: tooth movement and mandibular advancement.

10. An oral appliance system, comprising:
    one or more oral appliances having one or more sensor receiver and emitter pairs configured to collect sensor data, each of the one or more sensor receiver and emitter pairs including a sensor receiver on or in a first portion of the one or more oral appliances and a sensor emitter on a second portion of the one or more oral appliances, wherein each sensor receiver is configured to receive a signal emitted by a corresponding sensor emitter; and
    at least one processor configured to:
        determine a status of the one or more oral appliances based on the sensor data, wherein the status includes one or more of: user compliance, condition of the one or more oral appliances, and effectiveness of the one or more oral appliances; and determine whether to modify a treatment plan implemented by the one or more oral appliances based on the determined status of the one or more oral appliances.

11. The oral appliance system of claim 10, wherein at least one sensor receiver is on or in a first oral appliance, and at least one sensor emitter is on or in a second oral appliance different than the first oral appliance.

12. The oral appliance system of claim 11, wherein the first oral appliance is configured to be worn on a patient's upper arch, and the second oral appliance is configured to be worn on the patient's lower arch.

13. The oral appliance system of claim 11, wherein the one or more sensor receiver and emitter pairs is configured to detect contact or proximity between the first oral appliance and the second oral appliance.

14. The oral appliance system of claim 10, wherein at least one sensor receiver and at least one sensor emitter is on or in a single oral appliance.

15. The oral appliance system of claim 14, wherein the one or more sensor receiver and emitter pairs is configured to detect deformation of the single oral appliance.

16. The oral appliance system of claim 14, wherein the one or more sensor receiver and emitter pairs is configured to detect movement of one or more teeth.

17. The oral appliance system of claim 10, wherein the one or more sensor receiver and emitter pairs includes one or more of: a capacitive sensor, a proximity sensor, a magnetic sensor, an optical sensor, a force sensor, a pressure sensor, a strain gauge, a resistive sensor, a motion sensor, a vibration sensor, a temperature sensor, and an ultrasonic sensor.

18. The oral appliance system of claim 10, wherein the determining the status of the one or more oral appliances includes determining movement of one or more teeth.

19. The oral appliance system of claim 10, wherein the one or more sensor receiver and emitter pairs is within tooth receiving cavities of the one or more oral appliances.

* * * * *